United States Patent
Ezrielev et al.

(10) Patent No.: US 12,423,938 B2
(45) Date of Patent: Sep. 23, 2025

(54) SYSTEM AND METHOD FOR IDENTIFYING AUXILIARY AREAS OF INTEREST FOR IMAGE BASED ON FOCUS INDICATORS

(71) Applicant: Dell Products L.P., Round Rock, TX (US)

(72) Inventors: Ofir Ezrielev, Be'er Sheva (IL); Amihai Savir, Newton, MA (US); Oshry Ben-Harush, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 17/872,932

(22) Filed: Jul. 25, 2022

(65) Prior Publication Data

US 2024/0029388 A1    Jan. 25, 2024

(51) Int. Cl.
| | |
|---|---|
| *G06V 10/25* | (2022.01) |
| *G06V 10/22* | (2022.01) |
| *G06V 10/764* | (2022.01) |

(52) U.S. Cl.
CPC ............ *G06V 10/25* (2022.01); *G06V 10/235* (2022.01); *G06V 10/764* (2022.01)

(58) Field of Classification Search
CPC .... G06V 10/25; G06V 10/235; G06V 10/764; G06V 10/945; G06V 20/695
See application file for complete search history.

(56) References Cited

U.S. PATENT DOCUMENTS

| | | |
|---|---|---|
| 6,246,804 B1 | 6/2001 | Sato et al. |
| 8,576,238 B1 | 11/2013 | Brandt |
| 8,600,143 B1 | 12/2013 | Kulkarni |
| 8,862,741 B1 | 10/2014 | Tegtmeier |
| 8,873,836 B1 | 10/2014 | Dietrich |
| 8,935,474 B1 | 1/2015 | Todd |
| 9,324,145 B1 | 4/2016 | Cherevatsky |
| 9,665,799 B1 | 5/2017 | Munteanu |

(Continued)

FOREIGN PATENT DOCUMENTS

| | | | | |
|---|---|---|---|---|
| WO | WO-2008012717 A2 * | 1/2008 | ............ | G06F 3/013 |
| WO | 2010051037 A1 | 5/2010 | | |

(Continued)

OTHER PUBLICATIONS

Cox, The Role of Mouse Movements in Interactive Search, Proceedings of the Annual Meeting of the Cognitive Science Society, 2006 (Year: 2006).*

(Continued)

*Primary Examiner* — Vu Le
*Assistant Examiner* — Lei Zhao
(74) *Attorney, Agent, or Firm* — WOMBLE BOND DICKINSON (US) LLP

(57) ABSTRACT

Methods and systems for identifying areas of interest in an image are disclosed. To manage identification of areas of interest in an image, a combination of automated and subject matter expert driven processes may be used to identify the areas of interest. Some areas of interest may be highly relevant for a user of an image and may be classified as primary areas of interest. The image and subsequent use of the image may be enhanced through the areas of interest by improving storage and downstream usability of the image.

20 Claims, 15 Drawing Sheets

(56) References Cited

U.S. PATENT DOCUMENTS

| | | |
|---|---|---|
| 10,109,051 B1 | 10/2018 | Natesh et al. |
| 11,393,575 B1 | 7/2022 | Ceballos Lentini |
| 11,948,687 B2 | 4/2024 | Jaber |
| 12,144,551 B1 | 11/2024 | Farley |
| 2001/0030667 A1 | 10/2001 | Kelts |
| 2004/0100476 A1 | 5/2004 | Morita |
| 2004/0101176 A1 | 5/2004 | Mendonca |
| 2004/0117358 A1 | 6/2004 | Von Kaenel |
| 2006/0112334 A1 | 5/2006 | Endrikhovski |
| 2006/0159367 A1 | 7/2006 | Zeineh |
| 2007/0064981 A1 | 3/2007 | Meijer |
| 2007/0160274 A1 | 7/2007 | Mashiach |
| 2007/0263915 A1 | 11/2007 | Mashiach |
| 2008/0184068 A1 | 7/2008 | Mogi |
| 2008/0242968 A1 | 10/2008 | Claus |
| 2009/0074275 A1 | 3/2009 | O Ruanaidh |
| 2009/0210427 A1 | 8/2009 | Eidler |
| 2009/0290811 A1 | 11/2009 | Imai |
| 2011/0002555 A1 | 1/2011 | Sodagar |
| 2011/0110568 A1 | 5/2011 | Vesper |
| 2013/0022251 A1 | 1/2013 | Chen |
| 2013/0162664 A1 | 6/2013 | Peacock |
| 2014/0002466 A1 | 1/2014 | Paragios |
| 2015/0030231 A1 | 1/2015 | Porikli |
| 2015/0073909 A1 | 3/2015 | Peden |
| 2015/0134661 A1 | 5/2015 | Circlaeys |
| 2015/0278249 A1 | 10/2015 | Akiyama et al. |
| 2015/0332111 A1 | 11/2015 | Kisilev |
| 2016/0062689 A1 | 3/2016 | Cherubini |
| 2016/0284103 A1 | 9/2016 | Huang |
| 2017/0249744 A1 | 8/2017 | Wang |
| 2017/0273651 A1 | 9/2017 | Behrooz |
| 2018/0245979 A1 | 8/2018 | Park |
| 2018/0276815 A1 | 9/2018 | Xu |
| 2018/0315193 A1 | 11/2018 | Paschalakis |
| 2019/0011703 A1 | 1/2019 | Robaina |
| 2019/0244346 A1 | 8/2019 | Schafer |
| 2019/0333197 A1 | 10/2019 | Kask |
| 2020/0043600 A1 | 2/2020 | Glottmann |
| 2020/0092571 A1 | 3/2020 | Tourapis |
| 2020/0143171 A1 | 5/2020 | Lee |
| 2020/0175324 A1 | 6/2020 | Takahashi |
| 2020/0184252 A1 | 6/2020 | Syeda-Mahmood |
| 2020/0193608 A1 | 6/2020 | Sato |
| 2020/0193609 A1 | 6/2020 | Dharur |
| 2020/0234451 A1 | 7/2020 | Holzer |
| 2020/0285880 A1 | 9/2020 | Sedai |
| 2020/0342595 A1 | 10/2020 | Jia |
| 2020/0372718 A1 | 11/2020 | Molyneaux |
| 2020/0373013 A1 | 11/2020 | Cao |
| 2020/0410669 A1 | 12/2020 | Psota |
| 2020/0411164 A1 | 12/2020 | Donner |
| 2021/0035342 A1 | 2/2021 | Glaser |
| 2021/0068778 A1 | 3/2021 | Morley |
| 2021/0073449 A1 | 3/2021 | Segev |
| 2021/0090261 A1 | 3/2021 | Sugimoto |
| 2021/0142559 A1 | 5/2021 | Yousefhussien |
| 2021/0150682 A1 | 5/2021 | Sytnik |
| 2021/0209488 A1 | 7/2021 | Li |
| 2021/0223150 A1 | 7/2021 | Yoon |
| 2021/0233213 A1 | 7/2021 | Mejjati |
| 2021/0295528 A1 | 9/2021 | Fuchs |
| 2021/0345955 A1 | 11/2021 | Jones |
| 2021/0366145 A1 | 11/2021 | Yamamoto |
| 2021/0374965 A1 | 12/2021 | Richter |
| 2021/0383242 A1 | 12/2021 | Ostyakov |
| 2021/0383535 A1 | 12/2021 | Li |
| 2022/0076411 A1 | 3/2022 | Georgescu |
| 2022/0091259 A1 | 3/2022 | Hucks |
| 2022/0101533 A1 | 3/2022 | Hufford |
| 2022/0116549 A1 | 4/2022 | Neofytou |
| 2022/0138931 A1 | 5/2022 | Palma |
| 2022/0138933 A1 | 5/2022 | Wang |
| 2022/0139531 A1 | 5/2022 | Wang |
| 2022/0147768 A1 | 5/2022 | Thermos |
| 2022/0157063 A1 | 5/2022 | Bronicki |
| 2022/0172464 A1 | 6/2022 | Ross |
| 2022/0284118 A1* | 9/2022 | Kaul ............... G06T 5/50 |
| 2022/0284570 A1 | 9/2022 | Tan |
| 2022/0318995 A1 | 10/2022 | Chen |
| 2022/0343493 A1 | 10/2022 | Katekari |
| 2022/0354356 A1 | 11/2022 | Weeks |
| 2022/0358775 A1 | 11/2022 | Hantehzadeh |
| 2022/0391615 A1 | 12/2022 | Machefer |
| 2023/0051436 A1 | 2/2023 | Ahmad |
| 2023/0069310 A1 | 3/2023 | Myronenko |
| 2023/0206447 A1 | 6/2023 | Kobayashi et al. |
| 2023/0252638 A1 | 8/2023 | Hotson |
| 2023/0329607 A1 | 10/2023 | Huttunen |
| 2023/0340759 A1 | 10/2023 | Bruflodt |
| 2024/0029241 A1 | 1/2024 | Ezrielev |
| 2024/0029242 A1 | 1/2024 | Ezrielev |
| 2024/0029263 A1 | 1/2024 | Ezrielev |
| 2024/0249415 A1 | 7/2024 | Aslan |

FOREIGN PATENT DOCUMENTS

| | | | |
|---|---|---|---|
| WO | 2015015341 A1 | 2/2015 | |
| WO | 2017213244 A1 | 12/2017 | |
| WO | WO-2022064409 A1 * | 3/2022 | ............ G06N 20/00 |
| WO | 2022070528 A1 | 4/2022 | |

OTHER PUBLICATIONS

Goodfellow, Ian J., et al. "Generative Adversarial Nets", Departement d'informatique et de recherche operationnelle, Universite de Montreal, Montreal, QC H3C 3J7, Canada. arXiv:1406.2661v1 [stat.ML] Jun. 10, 2014. 9 pages.

Radford, Alec, et al. "Unsupervised Representation Learning with Deep Convolutional Generative Adversarial Networks", indico Research, Boston, MA. Under review as a conference paper at ICLR 2016. arXiv:1511.06434v2 [cs.LG] Jan. 7, 2016. 16 pages.

Goodfellow, Ian, "NIPS 2016 Tutorial: Generative Adversarial Networks", OpenAl. arXiv:1701.00160v4 [cs.LG] Apr. 3, 2017. 57 pages.

Allwardt, Vanessa, et al. "Translational Roadmap for the Organs-on-a-Chip Industry toward Broad Adoption", Bioengineering 2020, 7, 112; Sep. 16, 2020. 27 pages.

Kilic, Tugba, et al. "Organs-on-chip monitoring: sensors and other strategies", Microphysiological Systems, 2018; 2:5; Sep. 5, 2018. 32 pages.

"Causal Discovery from Spatio-Temporal Data with Applications to Climate Science", Ebert-Uphoff, Imme, School of Electrical and Computer Engineering, Colorado State University, Fort Collins, CO; and Deng, Yi, School of Earth and Atmospheric Sciences, Georgia Institute of Technology, Atlanta, GA. Dec. 2014. 8 pages.

ZEN Microscopy Software, "Your Complete Solution from Sample to Knowledge", Zeiss; Carl Zeiss Microscopy GmbH, 07745 Jena, Germany. Jul. 2021. 28 pages.

ZEN Data Storage and Data Explorer, "Smart data management in life sciences", Zeiss; updated: Oct. 2020; Carl Zeiss Microscopy GmbH, 07745 Jena, Germany; Oct. 2020. 4 pages.

Torfi, Amirsina, et al. "Differentially Private Synthetic Medical Data Generation using Convolutional GANs", ARXIV Submission Version. arXiv:2012.11774v1 [cs.LG] Dec. 22, 2020. 13 pages.

Lena Oden, "Comparing Data Staging Techniques for Large Scale Brain Images", IEEE Transactions on Emerging Topics in Computing, Dec. 6, 2021, 12 pages (Year: 2021).

Raghunath et al., "Mouse cursor movement and eye tracking data as an indicator of pathologists' attention when reviewing digital whole slide images", 2012, J Pathol Inform 2012;3:43 (Year: 2012) (8 pages).

* cited by examiner

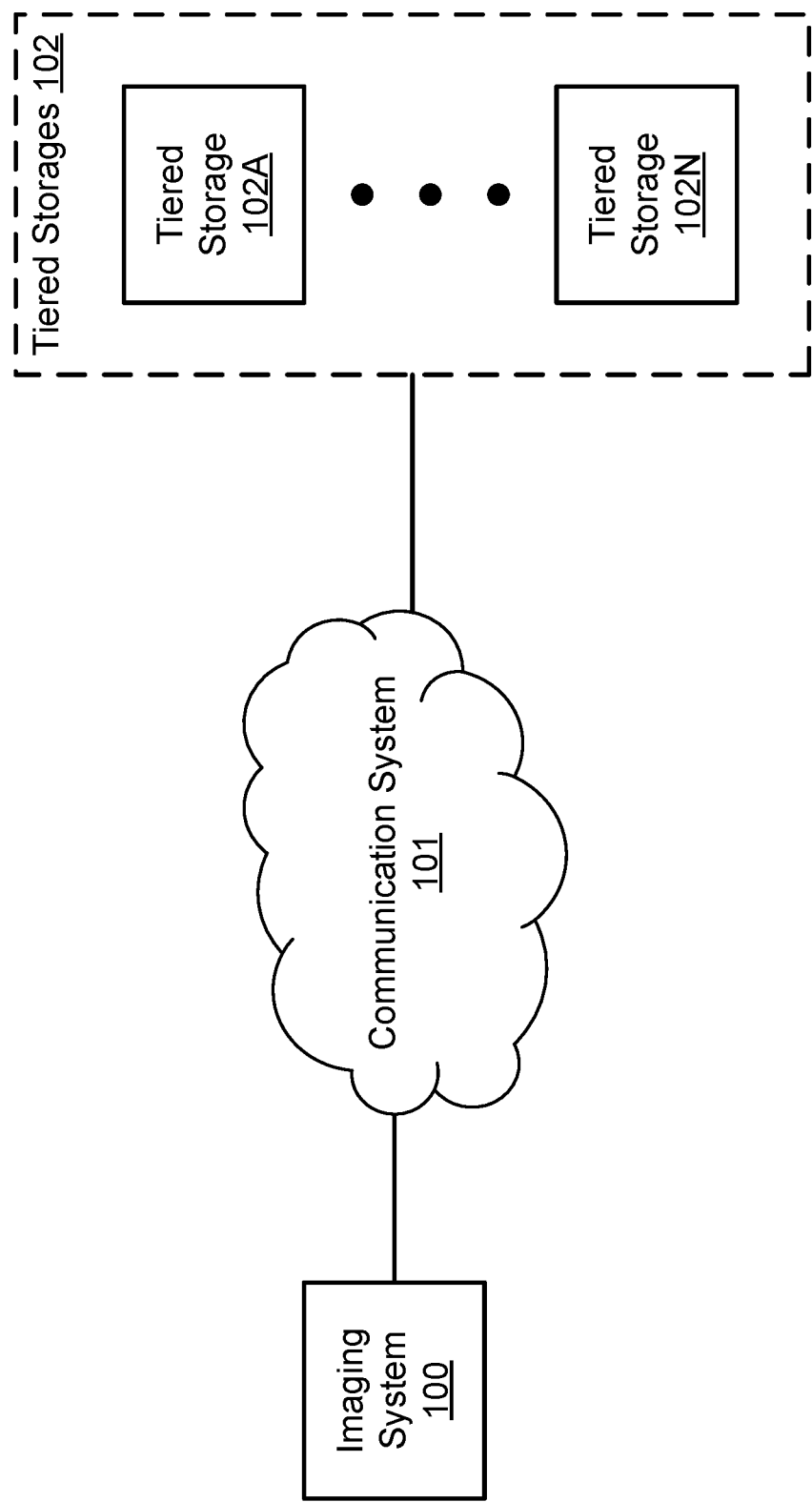

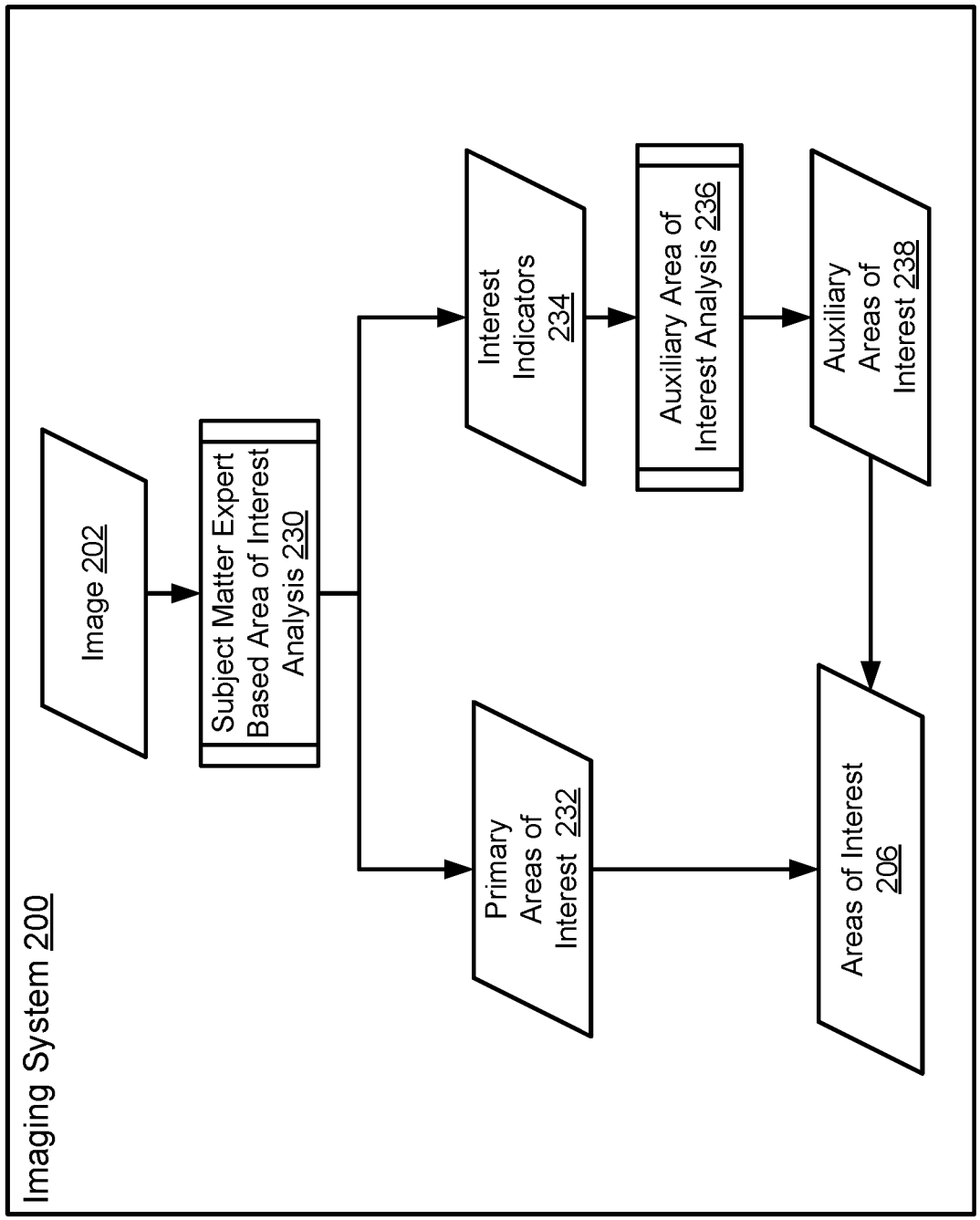

SYSTEM AND METHOD FOR IDENTIFYING AUXILIARY AREAS OF INTEREST FOR IMAGE BASED ON FOCUS INDICATORS

FIELD

Embodiments disclosed herein relate generally to image classification. More particularly, embodiments disclosed herein relate to systems and methods to manage the classification of areas of interest in an image.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIG. 2B shows a block diagram illustrating data flows for obtaining area of interest for an image in accordance with an embodiment.

DETAILED DESCRIPTION

Figure 2A:
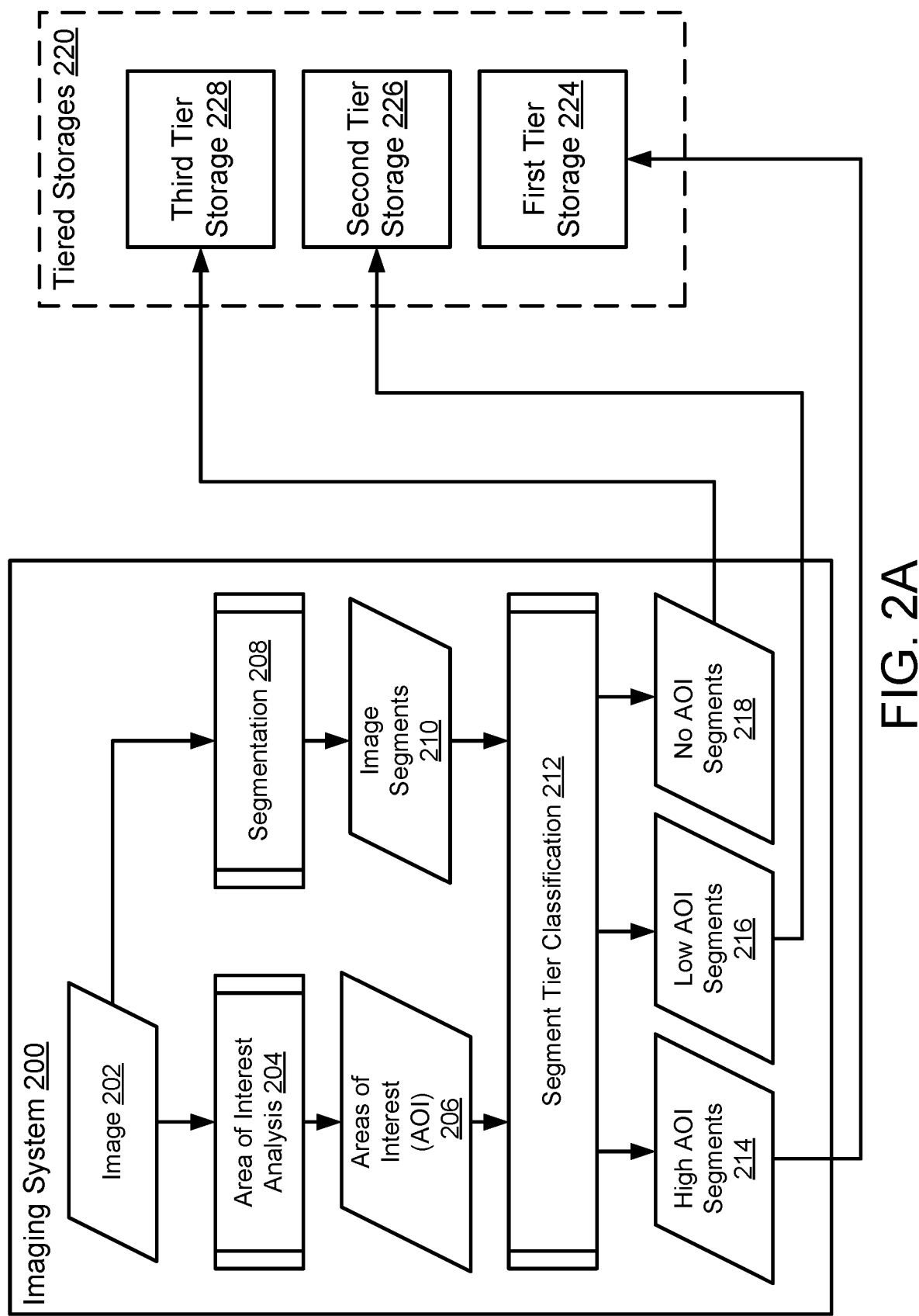
FIG. 2A shows a block diagram illustrating an imaging system and multiple tiered storages over time in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for identifying areas of interest in an image. To identify areas of interest in an image, the system may include an imaging system. The imaging system may cooperate with a subject matter expert to identify areas of interest in an image. Various processes and/or services may be keyed to the areas of interest, and the areas of interest may be provided to a downstream consumer in order to facilitate further analysis and/or interpretation of the image. For example, areas of interest may be relevant in medical settings to diagnose medical conditions. However, identifying only the most relevant areas of interest may overlook features of the image that contributed to a medical diagnosis made with the image. Other areas (e.g., auxiliary areas of interest) may also prove useful to a downstream consumer and for other purposes.

To identify areas of interest relevant to the processes and/or services that may use the image, both primary areas of interest and auxiliary areas of interest in an image may be identified. Primary areas of interest may include regions of an image with the highest degree of relevance to an outcome and may be identified by a subject matter expert.

Auxiliary areas of interest may include regions of the image that contributed (e.g., more significantly than other areas of the image) to the outcome determined by the subject matter expert, but that were not explicitly identified by the subject matter expert. To identify auxiliary areas of interest, the focus of the subject matter expert may be tracked during exploration of the image. The focus of the subject matter expert may be used to identify other areas of interest (e.g., auxiliary areas of interest) in an automated manner (e.g., without explicit direction of the subject matter expert).

The images and areas of interest (e.g., primary areas of interest and auxiliary areas of interest), may be stored across a number of storages that provide varying levels of storage performance and have correspondingly varying costs for storing data. To store the images across the storages, the images may be segmented into image segments and a likelihood of each of the image segments being used in the future may be identified. The image segments that are more likely to be used in the future may be stored in higher performance storages while the image segments that are less likely to be used in the future may be stored in lower performance storages.

To identify the likelihood of each of the image segments being used in the future, the image segments may be classified based on their membership in one or more areas of interest within the images. The areas of interest may include high areas of interest, low areas of interest, the auxiliary areas of interest, and/or other types of areas of interest. For example, the primary areas of interest may include portions of an image that are of highest levels of relevancy to an inference that was achieved using the image and may be classified as a high area of interest. Similarly, the auxiliary area of interest may also be of higher relevance than other areas of the image (e.g., with respect to use of the image) and may be directed to storage with corresponding performance levels.

By doing so, embodiments disclosed herein may provide a system that identifies both primary and auxiliary areas of interest in an image in order to provide information relevant to a process and/or service that may utilize the image. Following the identification of the areas of interest, the system may preferentially store portions of images that are more likely to be used in higher performance but costlier storage while the portions of images that are less likely to be used in the future may be preferentially stored in lower performance, more cost-efficient storages.

In an embodiment, a method for managing images for use by downstream consumers is provided. The method may include obtaining an image of the images; obtaining a primary area of interest for the image; while obtaining the primary area of interest, obtaining focus indicators for the image based on a process through which the primary area of interest is obtained; obtaining, based on the focus indicators, an auxiliary area of interest for the image, the primary area of interest and the auxiliary area of interest being areas of interest for the image; and storing image segments of the image in storage tiers based on the areas of interest to facilitate use of the stored image by the downstream consumers.

Storing segments of the image may include segmenting the image to obtain the image segments; classifying the image segments based on the areas of interest for the image to obtain image segment classifications corresponding to the image segments; obtaining a storage tier allocation for each of the image segments based on a corresponding image segment classification of the image segment classifications to obtain storage tier allocations; and for each of the image segments, storing the image segment in a storage of a storage tier of the storage tiers, the storage tier of the storage tiers being based on a storage tier allocation of the storage tier allocations associated with the image segment.

Obtaining the focus indicators may include, while a subject matter expert views the image to annotate the primary area of interest for the image, correlating the subject matter expert's view of the image to portions of the image during the process through which the primary area of interest is obtained to obtain the focus indicators.

The auxiliary area of interest may be a diagnostically relevant area of interest in an instance of the focus indicators that specify that the subject matter expert focused on a portion of the portions of the image for a duration of time that exceeded a time threshold.

The auxiliary area of interest may be a diagnostically irrelevant area of interest in an instance of the focus indicators that specify that the subject matter expert focused on a portion of the portions of the image for a duration of time that failed to meet a time threshold.

Obtaining the primary area of interest may include presenting portions of an image to a subject matter expert; receiving user input from the subject matter input; and establishing the primary area of interest based on the user input.

Obtaining the focus indicators may include monitoring interest levels of the subject matter expert for the portions of the image; and establishing the focus indicators based on the interest levels.

Monitoring the interest levels may include tracking eye movement of the subject matter expert during presentation of the portions of the image.

The method may also include establishing a hierarchy for the portions of the image based on the tracked eye movement.

Monitoring the interest levels may include tracking pointer locations set by the subject matter expert during presentation of the portions of the image.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize images as part of the provided computer-implemented services.

The images may include, for example, super resolution images or other types of images of large size (and/or other sizes). The images may depict various types of scenes which may be useful for a range of purposes. For example, the images may depict scenes useful for medical diagnosis, accident analysis, surveying, and/or other types of purposes.

The computer-implemented services may include any type and quantity of computer-implemented services. The computer-implemented services may include, for example, (i) analysis services through which the images may be analyzed and information derived from the images may be obtained, (ii) data storage services for storing and providing copies of the images over time, and/or (iii) any other type of computer-implemented services that may be performed, at least in part, using images (e.g., image files).

To facilitate use of the images as part of the computer-implemented services, primary areas of interest in an image may be obtained and stored for future use. These primary areas of interest may be relevant to a use of the image. However, during the process of obtaining the primary areas of interest, other areas of interest may be identified but information regarding these other areas of interest may not be stored.

For example, a subject matter expert (SME) may be a medical professional that is tasked with reviewing and making a medical diagnosis based on the image. As part of the diagnostic process performed by the SME, the SME may review various portions of the image and annotate primary areas of interest that are highly diagnostically relevant to the medical diagnosis. However, during the review of the portions of the image, the SME may identify other areas of interest but may not annotate these other areas of interest. For example, if the SME reviews a portion of the image that is diagnostically irrelevant, the SME may not annotate the image as areas of interest that are not diagnostically relevant. In another example, the SME may not review portions of the image and may not add areas of interest indicating that these portions of the image were not reviewed. Consequently, during a subsequent interpretation of the image by a second subject matter expert or automated process, these downstream consumers of the image may only have a limited amount of information (e.g., the primary areas of interest) with which to either confirm, deny, or comment on the previous use (e.g., medical diagnosis) of the image.

Consequently, the downstream consumer may not take into account the same information taken into account by the previous interpreter during subsequent interpretation. Therefore, the downstream consumer may come to different conclusions than the SME using different information from the image.

In general, embodiments disclosed herein may provide methods, systems, and/or devices for managing images based on areas of interest in the images. To manage the images based on the areas of interest, a system may identify areas of interest in an image to facilitate the performance of desired computer-implemented services. To manage identification of areas of interest in an image, (i) an image may be obtained, (ii) primary areas of interest in the image may be identified, and (iii) auxiliary areas of interest may be obtained based on analysis of the process through which the primary images are obtained. By doing so, embodiments disclosed herein may provide a system capable of obtaining and using additional information to better manage images when compared to a system that may only manage images using primary areas of interest.

To obtain and process the images, the system of FIG. 1 may include imaging system 100. Imaging system 100 may obtain images, identify areas of interest in the image, provide the areas of interest to a downstream consumer, and store the images (and/or portions thereof) in storages (e.g., tiered storages 102) based on the likelihood of future access of each image and/or portions thereof.

Areas of interest may be identified through computer automation and/or in cooperation with one or more SMEs. For example, images (or portions thereof) may be presented to the SMEs as part of an interpretation process so that the SMEs may explore the images and identify primary areas of interest based on their expertise. The primary areas of interest may be sub-portions of the images (e.g., some number of pixels of the images). While illustrated in subsequent figures as rectangular areas, areas of interest (primary and/or auxiliary) may be of any shape without departing from embodiments disclosed herein. Any of the areas of interest may include, for example, one or more landmarks. A landmark may be portion of a scene depicted in an image that is relevant to an outcome with respect to a use of an image. In a medical context, a landmark may be a collection of cells, a portion of tissue, and/or other features of a depicted scene that the SME is trained to identify and/or use in making a medical diagnosis.

During the image exploration process, the focus of the SMEs may be tracked and used to identify auxiliary areas of interest for the images. To track the SME's focus during image exploration, eye tracking, pointer tracking, and/or other processes to identify portions of an image which the SME is focusing on during the image exploration may be performed. The focus of the SME may be used, for example, to establish a hierarchy for different portions of the image. The hierarchy may be used to establish auxiliary areas of interest of varying types.

For example, higher ranked portions of the image may be used to establish an auxiliary area of interest designated as being diagnostically relevant. In contrast, lower ranked portions of the image may be used to establish an auxiliary area of interest designated as being diagnostically irrelevant (or, at least designate such auxiliary areas of interest as requiring a smaller amount of time from a SME to review). Likewise, portions of the image that are unranked (e.g., never viewed by the SME) by the hierarchy may be used to establish an auxiliary area of interest designated as being diagnostically unconsidered. The hierarchy may be used to establish any number of types of auxiliary areas of interest.

The hierarchy may be based, for example, on the duration each portion of the image was viewed by the SME, the duration of time the SME positioned a pointer over each portion of the image, and/or on other indicators of the relative level of focus that the SME provided with respect to each portion of the image.

The portions of the image may be identified based on the view of the SME during the image exploration. For example, as the SME pans, rotates, and/or otherwise modifies a view of the image, these different views of portions of the image may be used to portion of the image. Thus, the portions of the image may include any number of portions, different portions may be of similar or different sizes (e.g., the SME may zoom in or out), and any of the portions may overlap with other portions of the image.

The portions of image may be used to establish, for example, a heat map. The heat map may specify a value for each of the pixels of the image based on a duration of time the SME viewed the pixel during the image exploration. The heat map may be used to establish portions for the image. For example, thresholds with respect to the values of the heat map corresponding to the pixels may be used to identify various portions of the image. To do so, a first threshold of a high relative value may be used to identify groups of pixels that have been highly viewed (e.g., long view durations during the image exploration). The second threshold of a low relative value may be used to identify other groups of pixels that have been infrequently viewed (e.g., low view durations). These groupings of pixels may be used to establish auxiliary areas of different types (e.g., the group of pixels that are highly viewed may be used to establish diagnostically relevant auxiliary areas while the groups of pixels that are infrequently viewed may be used to establish diagnostically irrelevant auxiliary areas).

While described with respect to medical diagnosis above, it will be appreciated that the areas of interest identified through automated and/or cooperative approaches may be used to achieve other types of goals.

Areas of interest (e.g., primary and/or auxiliary) may be provided (and/or identified) to a downstream consumer along with or separate from the image and/or outcome of a process for which the image is used as part of the computer-implemented services provided by the system. In an embodiment, the computer-implemented services may include storing the areas of interest (and/or corresponding image segments or images) in storage tiers of varying performance levels. In order to manage the storage of areas of interest, (i) the image may be segmented, (ii) the image segments may be classified based on the areas of interest (e.g., based on each image segments membership in various areas of interest), (iii) the image segment may be allocated for different storage tiers depending on the likelihood of future access of each image segment, and (iv) the image segments may be stored in storages of varying storage tiers based on the allocation for each respective image segment so that image segments that are more likely to be accessed in the future are stored in higher performance storage tiers and image segments that are less likely to be accessed in the future are stored in lower performance storage tiers. By doing so, embodiments disclosed herein may provide a more responsive system by improving the efficiency of resource allocation for accessing images while limiting cost incurred for responsiveness of the system.

For example, if an image segment includes a portion of the image that is within an area of interest, the image segment may be treated as having a high likelihood (or another level of likelihood depending on the level of area of interest in a hierarchy) of being accessed in the future. In another example, if an image segment is not within any areas of interest, the image segment may be treated as having a low likelihood of being accessed in the future. In a still further example, if an image segment is partially within an area of interest (e.g., straddles a boundary of an area of interest), then the image segment may be treated as having a medium likelihood of being accessed in the future. Other criteria may be used to ascertain the level of likelihood of an image segment being accessed in the future may be used without departing from embodiments disclosed herein. For example, image segments within auxiliary areas of interest designated as being diagnostically irrelevant may be stored in archival storage tiers or allocated for extremely cost effective storage tiers.

In addition to area of interest membership, the likelihood of an image segment being accessed in the future may also take into account a type of an area of interest. For example, when an image is processed different types of areas of interest may be identified (e.g., primary and auxiliary areas of interest). The types of the area of interest may define a hierarchy with respect to the areas of interest. The hierarchy may define a level of relevancy of each type of area of interest with respect to a purpose (e.g., a medical diagnosis) for which the image is annotated with the areas of interest.

For example, if an image segment is within an area of interest that is at a top of the hierarchy (e.g., a primary area of interest), the image segment may be treated as having a high likelihood of being accessed in the future. In a second example, if an image segment is within an area of interest that is in the middle of the hierarchy (e.g., an auxiliary area of interest designated as diagnostically relevant), the image segment may be treated as having a high (or medium) likelihood of being accessed in the future. In a third example, if an image segment is within an area of interest that is at a bottom of the hierarchy (e.g., an auxiliary area of interest designated as diagnostically irrelevant), the image segment may be treated as having a low likelihood of being accessed in the future.

To allocate the image segments for storage, imaging system 100 may perform a lookup to identify a storage plan or may otherwise identify a storage plan (e.g., based on an association) for an image segment based on the likelihood of the image segment being accessed in the future. The storage plan may specify (i) a storage tier, (ii) a migration plan between storage tiers (e.g., transferring image segments between tiered storages at different points in time), (iii) a fidelity level (e.g., resolution) for an image segment, and/or (iv) other information that defines how an image segment will be stored for future use. The storage plan may define the allocation for the image segment.

Once allocated, imaging system 100 may store the image segments in corresponding tiered storages of tiered storages 102. Tiered storages 102 may store image segments and/or other data structures. Tiered storages 102 may include any number of tiered storages (e.g., 102A, 102N). Different tiered storages may provide different quality levels with respect to storing data and/or providing copies of stored data. For example, different tiered storages may be implemented with different types and/or quantities of hardware devices. Consequently, different storage tiers may be more or less costly to implement depending on hardware/software components used to implement the storage tiers. To manage cost, tiered storages 102 may include tiered storages with different levels of performance and associated cost. Accordingly, imaging system 100 may store image segments that are more likely to be accessed in the future in higher performance storage tiers (which may have higher associated costs) and other image segments that are less likely to be accessed in the future in lower performance storage tiers.

In an embodiment, tiered storages 102 is implemented with a range of different storage tiers providing different levels of performance having corresponding levels of associated cost. Thus, the image segments may be distributed to the different storage tiers based on corresponding likelihoods of future access.

In an embodiment, tiered storages 102 is implemented with two storage tiers that provide different levels of performance having corresponding levels of associated cost. The image segments associated with areas of interest may be stored in a higher performance tiered storage and the image segments not associated with areas of interest may be stored in lower performance tiered storage.

When performing its functionality, one or more of imaging system 100 and tiered storages 102 may perform all, or a portion, of the methods and/or actions shown in FIGS. 3A-4J.

Any of imaging system 100 and tiered storages 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with a communication system (e.g., 101).

In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 101 is implemented with one or more local communications links (e.g., a bus interconnecting a processor of imaging system 100 and any of the tiered storages).

While illustrated in FIG. 1 as included a limited number of specific components, a system in accordance with an embodiment may include fewer, additional, and/or different components than those illustrated therein.

Turning to FIG. 2A, a data flow diagram in a system similar to that illustrated in FIG. 1 in accordance with an embodiment is shown. Imaging system 200 may be similar to imaging system 100, and tiered storages 220 may be similar to tiered storage 102.

Imaging system 200 may obtain image 202. Image 202 may be a data structure including information regarding a scene. For example, image 202 may be any type of image file. The image file may include lossy or lossless compression, may be of any family type (e.g., raster, vector, etc.) or a hybrid, and may include any quantity of information regarding a scene. The image file may be of any format (e.g., Joint Photographic Experts Group (JPEG), Tagged Image File Format (TIFF), Portable Network Graphics (PNG), Graphics Interchange Format (GIF), etc.). Image 202 may be obtained by receiving it from another device (e.g., an imaging device such as a camera), reading it from storage, or by generating it using an imaging device.

Imaging system 200 may perform an area of interest analysis 204 and/or segmentation 208 of image 202. These operations may generate data structures used to select storage location(s) for image 202, and/or store image 202.

Area of interest analysis 204 may identify one or more areas of interest 206 in image 202. Areas of interest 206 may correspond to regions (e.g., groups of pixels corresponding to portions of the depicted scene) of image 202. Each of the areas of interest may also be associated with a type reflecting a place within a hierarchy of the areas of interest (e.g., a primary area of interest, an auxiliary area of interest, etc.). In this manner, areas of interest of greater and/or lesser importance may be defined by the type of each of the areas of interest. Area of interest of similar importance may be of the same type. Refer to FIG. 2B for additional details regarding obtaining areas of interest.

Segmentation 208 may segment image 202 into any number of image segments 210. Image 202 may be segmented using any method (e.g., dividing into a number of portions with approximately the same quantity of information for different portions of the depicted scene) without departing from embodiments disclosed herein. The boundaries of each of image segments 210 may or may not conform to the boundaries of area of interest 206.

Once obtained, image segments 210 may be subject to segment tier classification 212 processing based on areas of interest 206 corresponding to the image segments. Segment tier classification 212 may classify image segments 210 based on the corresponding areas of interest, and allocate the classified image segments for storage in different storage tiers based on the classification of each image segment.

For example, all image segments associated with areas of interest that are of a high level of importance may be classified as high area of interest segments 214. Similarly, all image segments associated with areas of interest that are of a low level of importance may be classified as low area of interest segments 216. In contrast, all image segments that are not associated with any areas of interest may be classified as no area of interest segments 218. These classifications may be used to perform lookups (or other processes) to identify storage tiers for storage of the corresponding image segments. Once identified, the image segments may be allocated for and stored in storages corresponding to the identified storage tiers.

As seen in FIG. 2A, all of the image segments classified as high area of interest segments 214 may be stored in first tier storage 224, which may be a high performance but costly storage (e.g., a solid state disk). The image segments classified as low area of interest segments 216 may be stored in second tier storage 226, which may be a moderate performance storage (e.g., a hard disk drive) and of moderate cost. In contrast, all of the image segments classified as no area of interest segments 218 may be stored in third tier storage 228, which may be a low performance but low cost storage (e.g., a tape drive).

By storing the image segments in this manner, the usability of the storage image may be improved while limiting cost for storing the image for subsequent use. For example, if access to the image is required in the future, the segments of the image corresponding to the portion of the scene most likely to be displayed may be stored in higher performance storage thereby facilitate rapid reading of the segments into memory to facilitate display of this portion of the scene on a display and/or subsequent use. In contrast, the image segments of the image corresponding to the portion of the scene that is unlikely to be displayed may be stored in lower performance but cost effective storage to reduce aggregate cost for storing image 202 for subsequent use.

Turning to FIG. 2B, an expansion of area of interest analysis 204 in FIG. 2A is shown as performed by imaging system 200 in order to obtain areas of interest 206. Subject matter expert based area of interest processing 230 may identify primary areas of interest 232 in image 202. The subject matter expert based area of interest processing may include facilitating exploration of an annotation of images by a subject matter expert. For example, a graphical user interface including tools for navigating and annotating an image may be used by the SME to explore and annotate primary areas of interest 232. Primary areas of interest 232 may include regions (e.g., groups of pixels corresponding to portions of the depicted scene) of image 202. The regions may be assigned a rank of high relevance to the inferences generated by the inference model and may subsequently be assigned to a high performance storage tier.

Subject matter expert based area of interest processing 230 may also produce interest indicators 234. Interest indicators 234 may indicate the SME's interest in various portions of image 202 during exploration of image 202. The indicated portions may not be members of primary areas of interest 232.

Auxiliary area of interest analysis 236 may use interest indicators 234 to obtain auxiliary areas of interest 238. Auxiliary area of interest analysis 236 may include, as discussed above, obtaining a heat map, using thresholds to identify portions of image 202 based on the heat map, and/or designating the portion of image 202 as auxiliaries of interest based on the corresponding thresholds used to obtain the portions. Auxiliary areas of interest analysis 236 may be performed via other methods such as, for example, using views of image 202 during the SME's exploration of the image (e.g., which may be interest indicators 234) to obtain auxiliary areas of interest 238.

Figure 3A:
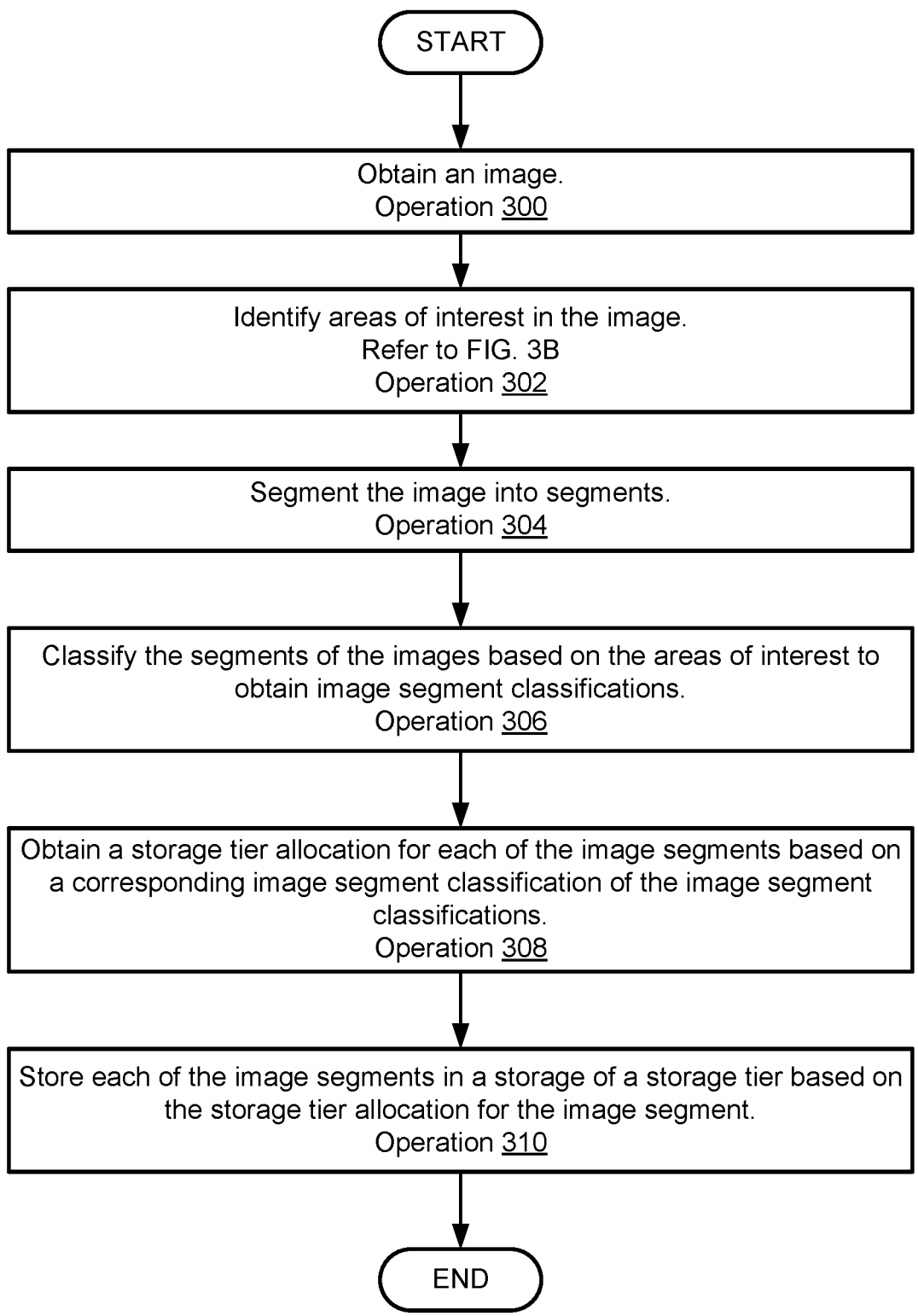
FIG. 3A shows a flow diagram illustrating a method of storing an image in accordance with an embodiment.
Figure 3B:
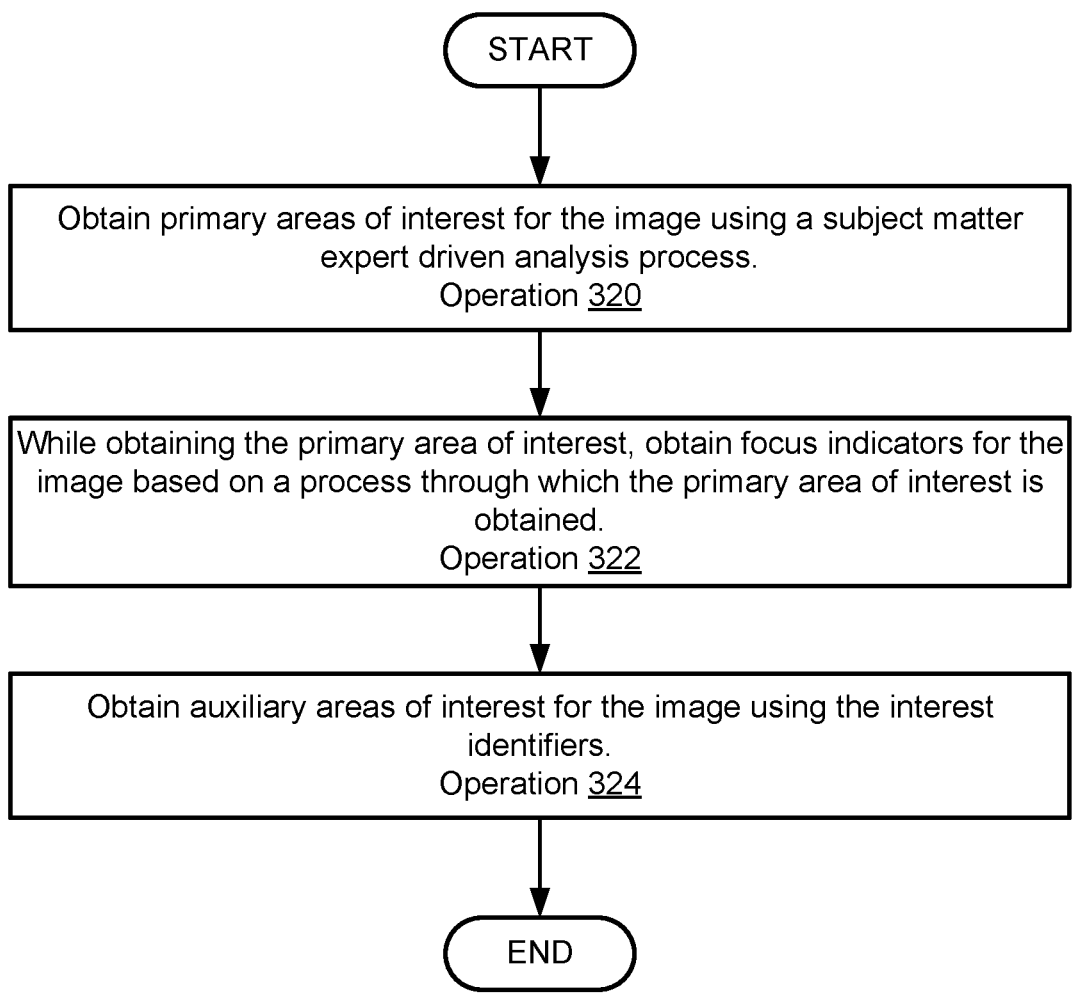
FIG. 3B shows a flow diagram illustrating a method of identifying areas of interest in an image in accordance with an embodiment.

Therefore, areas of interest 206 may include primary areas of interest 232 and/or auxiliary areas of interest 238. Auxiliary areas of interest 238 may not otherwise be designated by the SME during the SME's interpretation of image 202. Refer to FIG. 3B for additional details regarding obtaining auxiliary areas of interest.

As discussed above, the components of FIG. 1 may perform various methods to identify areas of interest in an image and manage storage of images to provide a desired level of accessibility while manage cost. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of storing an image in accordance with an embodiment is shown. The method may be performed by an imaging system or another data processing system.

At operation 300, an image is obtained. The image may be obtained by (i) reading the image from storage, (ii) receiving the image from another device, and/or (iii) generating the image (e.g., capturing it) through use of an imaging device such as a camera.

The image may depict a scene. The image may be interpreted through, for example, automated analysis and/or cooperative analysis with a SME. The image may depict, for example, a group of cells and/or other human tissues, a manufacturing process, an accident scene, a construction site, and/or any other type of scene for which derived information based on the depicted scene may be desired for various purposes.

In an embodiment, the image is a super resolution image. For example, the image may include large amounts of information and may require gigabytes of storage space for storage.

At operation 302, areas of interest in the image are identified. The areas of interest may be identified (i) by reading them from storage (e.g., if they already exist) and/or (ii) through automated and/or cooperative analysis of the image with a SME. The automated analysis may be performed in cooperation with a SME through display of portions of the image to the SME, obtaining input from the SME through which primary areas of interest are designated, tracking the SME's interest in various portions of the image, and designation of one or more of the portions that the SME has a sufficiently high or low (or other level) level of interest in as corresponding types of auxiliary areas of interest.

The areas of interest may be part of a hierarchical system that defines some of the areas of interest as being higher or lower in the hierarchy. For example, areas of interest more critical to an outcome of a process through which the areas of interest are identified may be higher in the hierarchy while other areas of interest less critical to the outcome of the process may be lower in the hierarchy. Any number of areas of interest at any level within the hierarchy may be identified for the image. Refer to FIG. 3B for additional details regarding identifying areas of interest.

For example, in the context of a medical image, the process may be a diagnosis of a medical condition. A SME may review the medical image as part of the diagnosis and may identify primary areas of interest, which may be of greater relevancy to the medical diagnosis. Consequently, if a second SME (e.g., a medical professional or an inference model trained to make medical diagnosis based on images) reviews the medical image, it may be likely that the second SME may only review the primary areas of interest (or only a subset of the primary areas of interest) to double check or otherwise verify a previously made diagnosis, or use the medical image for other purposes (e.g., research). Refer to FIGS. 4A-4J for additional information regarding areas of interest.

In contrast, by obtaining a richer array of areas of interest as disclosed herein, embodiments disclosed herein may improve use of images by downstream consumers such as subsequent interpreters. For example, the subsequent interpreters may have access to far more information regarding the previously performed image interpretation. Consequently, the subsequent interpreter may need to review less of the image to confirm or deny an outcome of the previous image interpretation.

At operation 304, the image is segmented into segments. The image segments may be portions of the image. The image segments may be similar or different amounts of the image. Refer to FIGS. 4H-4J for additional information regarding image segments.

At operation 306, the image segments are classified based on the areas of interest to obtain image segment classifications. The image segments may be classified based on their membership in the areas of interest. An image segment may be a member of an area of interest if the image segment includes of a portion of the image that lies within a boundary that defines the area of interest. The memberships in the areas of interest may be used to calculate a value representative of a likelihood of the image segment being accessed in the future. The value may be used to classify the image segment into one of any number of groups (e.g., primary areas of interest, auxiliary areas of interest, etc.) of image segments. The aforementioned process may be repeated for each image segment to classify each of the image segments.

At operation 308, a storage tier allocation for each of the image segments is obtained. The storage tier allocation for each of the image segments may be based on a corresponding image segment classification for the respective image segment. For example, a lookup (or other process) may be performed based on the corresponding image segment classification to identify the storage tier allocation for each image segment. The storage tier allocation may, for example, indicate where an image segment is stored, provide a plan for managing storage of the image segment (e.g., levels of redundancy, migration plans, etc.), a resolution or other information regarding the fidelity of the image segment, and/or may provide other information regarding storage of the image segment. A storage tier allocation for each segment may be obtained.

At operation 310, each of the image segments is stored in a storage of a storage tier based on the corresponding storage tier allocation. The image segments may be stored by providing the image segments to the respective storages and/or instructions to store the image segments in the corresponding storages. The copies of the image segments provided to the storage may be performed to the fidelity levels and/or other information specified in the storage allocation.

For example, the storage tier allocation for image segments that are not associated with areas of interest may indicate that these image segments are to be stored in a reduced resolution format (or at a prescribed level of fidelity). In this manner, both the cost for the storage tier and the quantity of resources of the storage tier used to store an image segment may be scaled based on the relative importance of each image segment.

Additionally, in some embodiments, the storage tier allocation for the image segments may specify a level of redundancy such that, depending on the image segment classifications: (i) lowest fidelity copies of image segments may be stored in archival storage tiers, (ii) lower fidelity copies of the image segments may be stored in lower tiered storage, and/or (iii) full or high fidelity copies of the image segments may be stored in higher tiered storage.

The method may end following operation 310.

Turning to FIG. 3B, a flow diagram illustrating a method of identifying areas of interest in accordance with an embodiment is shown. The method may be performed by an imaging system or another data processing system. The operations shown in FIG. 3B may be an expansion of operation 302 in FIG. 3A.

At operation 320, primary areas of interest in the image are obtained using a subject matter expert driven analysis process. The subject matter expert driven analysis process may include (i) displaying a graphical user interface to the SME that includes tools for viewing portions of the image and adding annotations to indicate primary areas of interest, (ii) receiving user input via the graphical user interface used to facilitate exploration and annotation of the image by the SME, and (iii) tracking the SME's interest in portions of the image during the image exploration and annotation.

The SME's interest in the portions of the image may be tracked by, for example, monitoring eye movement of the SME (e.g., which may be correlated to portions of the image displayed to the SME through a correlation function), monitoring positioning of a pointer (e.g., a mouse pointer displayed via the graphical user interface and operated by the SME), and/or other processes for assessing the SME's focus on portions of the image during the image exploration to obtain the interest indicators.

At operation 322, during the SME driven analysis process, interest indicators for the image are obtained. The interest indicators may be obtained, as noted above, through tracking the SME's interest in the portions of the image while the SME explores and/or annotates the image with one or more primary areas of interest.

In an embodiment, the SME's interest in portions of the image is tracked by establishing a heat map for the image. The heat map may include values corresponding to the pixels of the image weighted based on a duration of display (or view by the SME) of each of the pixels of the image via the graphical user interface to the SME while the SME is exploring and/or annotating the image. Portions of the image may be designated by using thresholds of varying levels to filter the heat map. The interest indicator for each remaining portion after filtering may be the threshold level used during the filtering. In this manner, various portions may be identified meeting various filter conditions (e.g., exceeding filter thresholds, being within filter thresholds, etc.) and, consequently, may have various corresponding identifier indicators.

For example, consider a scenario where a heat map is initially filtered for values exceeding a high threshold. The filtering may result in islands being generated. The islands may be used as the portions, and the high threshold may be treated as the interest indicator for each of these portions. In contrast, consider a second scenario where the heat map is filtered for values within a low threshold. The filtering may result in islands being generated. These islands may also be used as some of the portions, and the low threshold may be treated as the interest indicator for each of these portions. In this manner, various portions having various interest indicators may be established, for various types of threshold based processes (e.g., being within a threshold, exceeding a threshold, etc.).

At operation 324, auxiliary areas of interest for the image are obtained using the interest indicators. The auxiliary areas of interest may be obtained by designating various portions identified in operation 322 as auxiliary areas of interest. The type of each auxiliary area of interest may be defined by the corresponding interest indicator associated with the corresponding portion. Thus, any number of auxiliary areas of interest may be identified.

The areas of interest (primary and auxiliary) may be implemented, for example, using metadata associated with the image.

The method may end following operation 324.

Using the method illustrated in FIGS. 3A-3B, embodiments disclosed herein may provide a system that identifies both primary and auxiliary areas of interest. By identifying both primary and auxiliary areas of interest, downstream users of the image may have additional information regarding previous interpretation of the image and various segments of the image may be stored in a more cost efficient manner. In this manner, the operation of a data processing system that may use the image may appear to its user to be of higher capability than the data processing system's actual capability through selective storage of portions of the image in higher performance storage while relegating other portions for storage in more cost effective but lower performance storage.

Turning to FIGS. 4A-4J, diagrams illustrating a process of storing an image in accordance with an embodiment are shown.

Figure 4A:
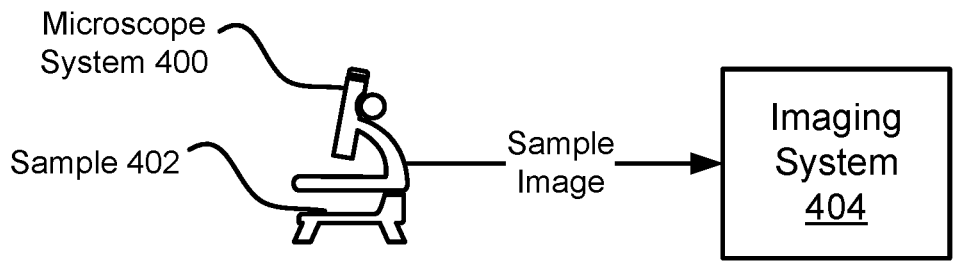
FIGS. 4A-4J show diagrams illustrating a system, operations performed thereby, and data structures used by the system over time in accordance with an embodiment.

Turning to FIG. 4A, consider a scenario in which a medical image of sample 402 useful for medical diagnosis purposes is obtained using microscope system 400, which may include a camera and some number of lenses used to project a depiction of sample 402 on a capture device of the camera. The sample image may be obtained by imaging system 404, which may be similar to the imaging system illustrated in FIG. 1.

Figure 4B:
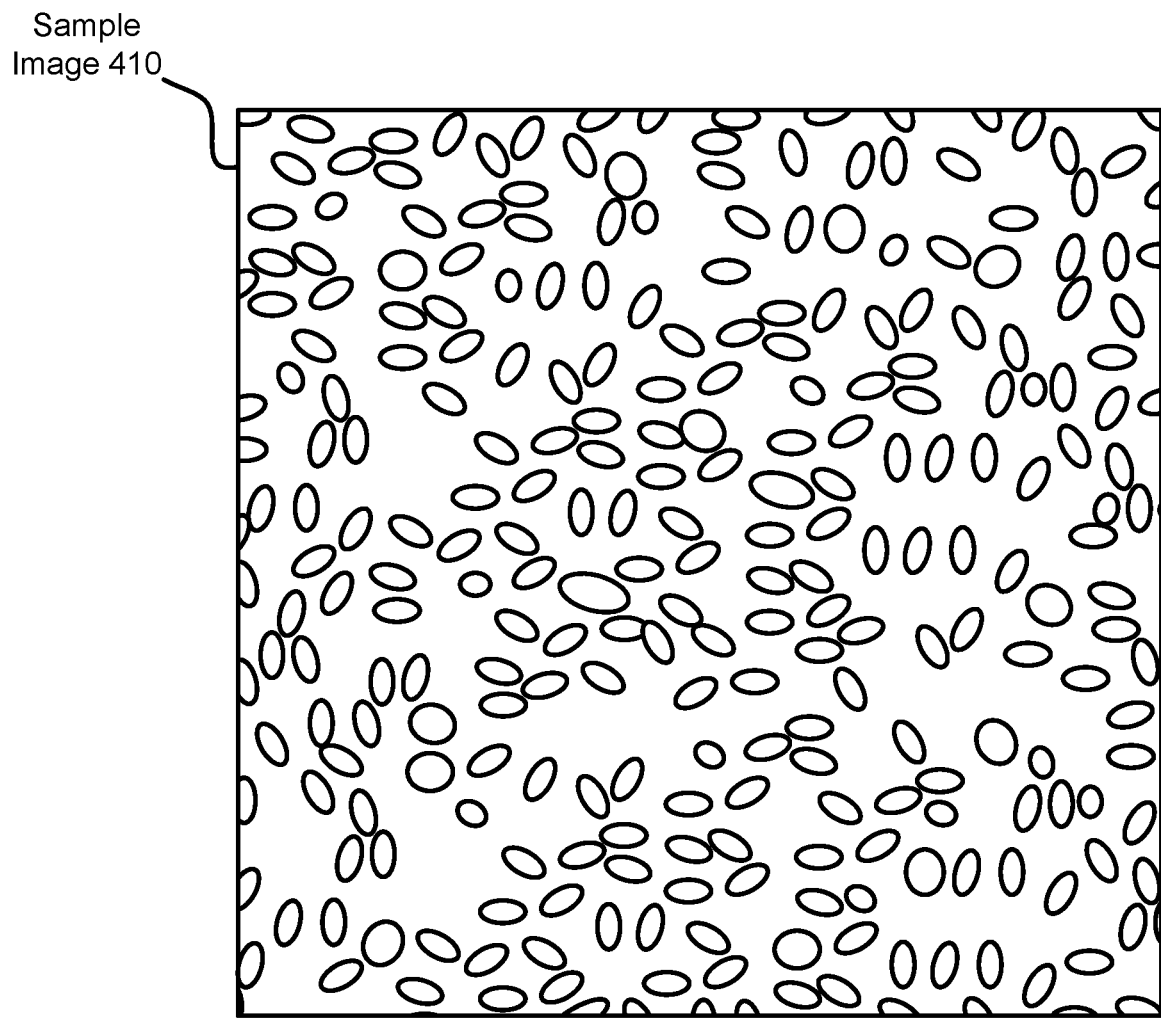

Turning to FIG. 4B, a diagram of sample image 410 in accordance with an embodiment is shown. Sample image 410 may be complex and include many features regarding a scene. For example, sample 402 may be a tissue sample from a person. In FIG. 4B, the circles within the border of sample image 410 may represent portions of the image corresponding to cells, proteins, and/or other portions of the tissue. To perform a medical diagnosis, the content and structure of these cells, proteins, and/or other portions of the tissue may be analyzed (e.g., by a SME). As part of that analysis, an outcome (e.g., a medical diagnosis in this example) and one or more primary areas of interest for the image may be identified.

Figure 4C:
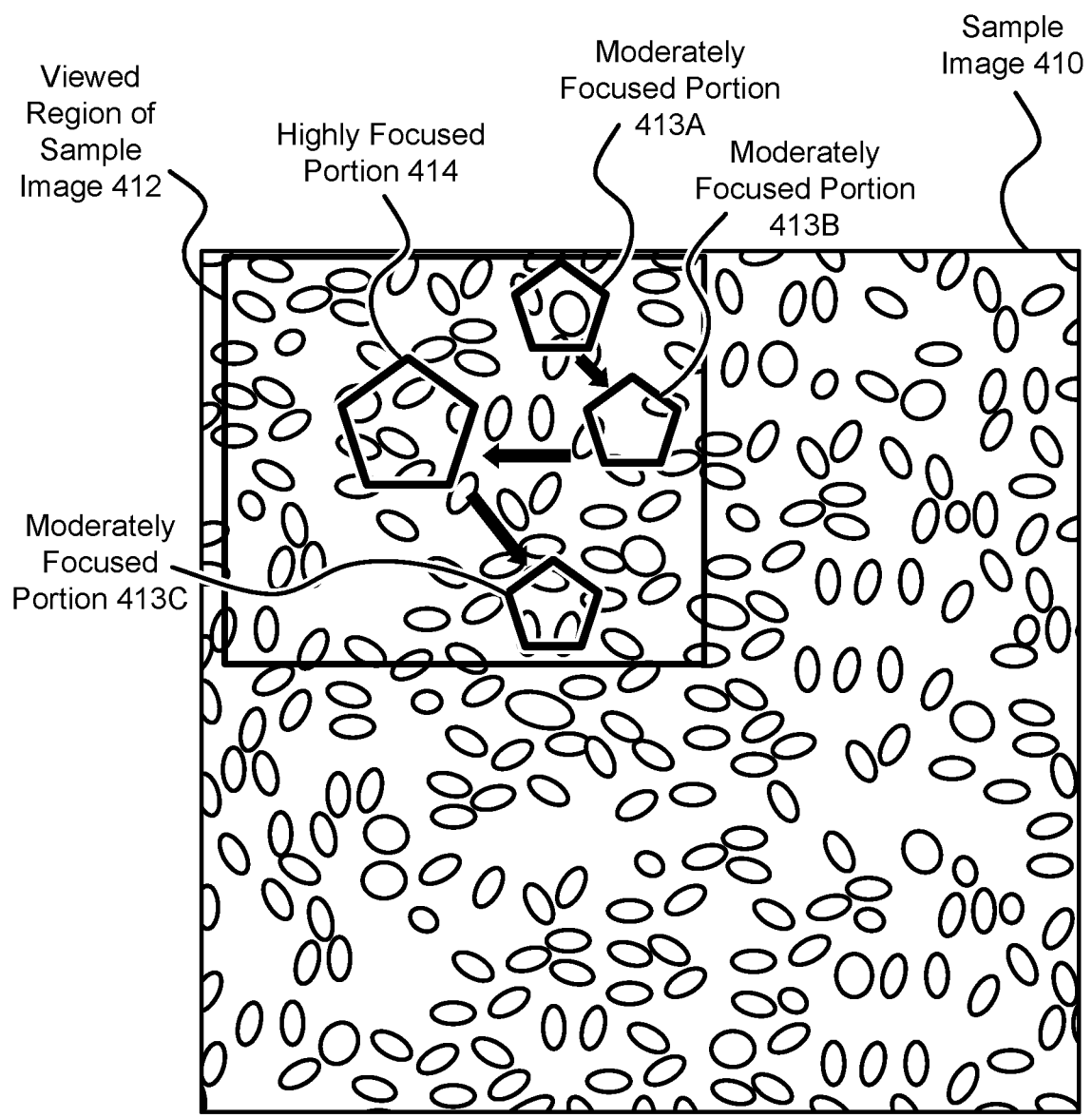

Turning to FIG. 4C, a second diagram of sample image 410 is shown and includes annotations reflecting the analysis process. As noted above, the analysis process for sample image 410 may include a cooperative process performed with a SME. The SME may explore and add annotations to sample image 410 as part of the analysis. To do so, portions of sample image 410 may be presented to the SME via a graphical user interface.

In this example, the SME only needs to view a portion of sample image 410 demarked by view region of sample image 412 (e.g., the region inside of the rectangle may be displayed to the SME). While the portion of sample image 410 is displayed to the SME, the eye movement, pointer movement, and other activity of the SME may be monitored to identify portions of view region of sample image 412 focused on by the SME during the image exploration.

In this example, the SME briefly scans viewed region of sample image 412, and then focuses initially on moderately focused portion 413A for a first duration of time. After focusing on moderately focused portion 413A, the SME then focuses on moderately focused portion 413B and highly focuses portion 414, respectively. In contrast to moderately focuses portions 413A, 414B, the SME spends more time focusing on highly focused portion 414. After focusing on high focused portion 414, the SME then moves focus to moderately focused portion 413C. All of these decisions and relative time spent focusing on these portions may be in accordance with the SME training to establish a medical diagnosis, which the SME next establishes.

Figure 4D:
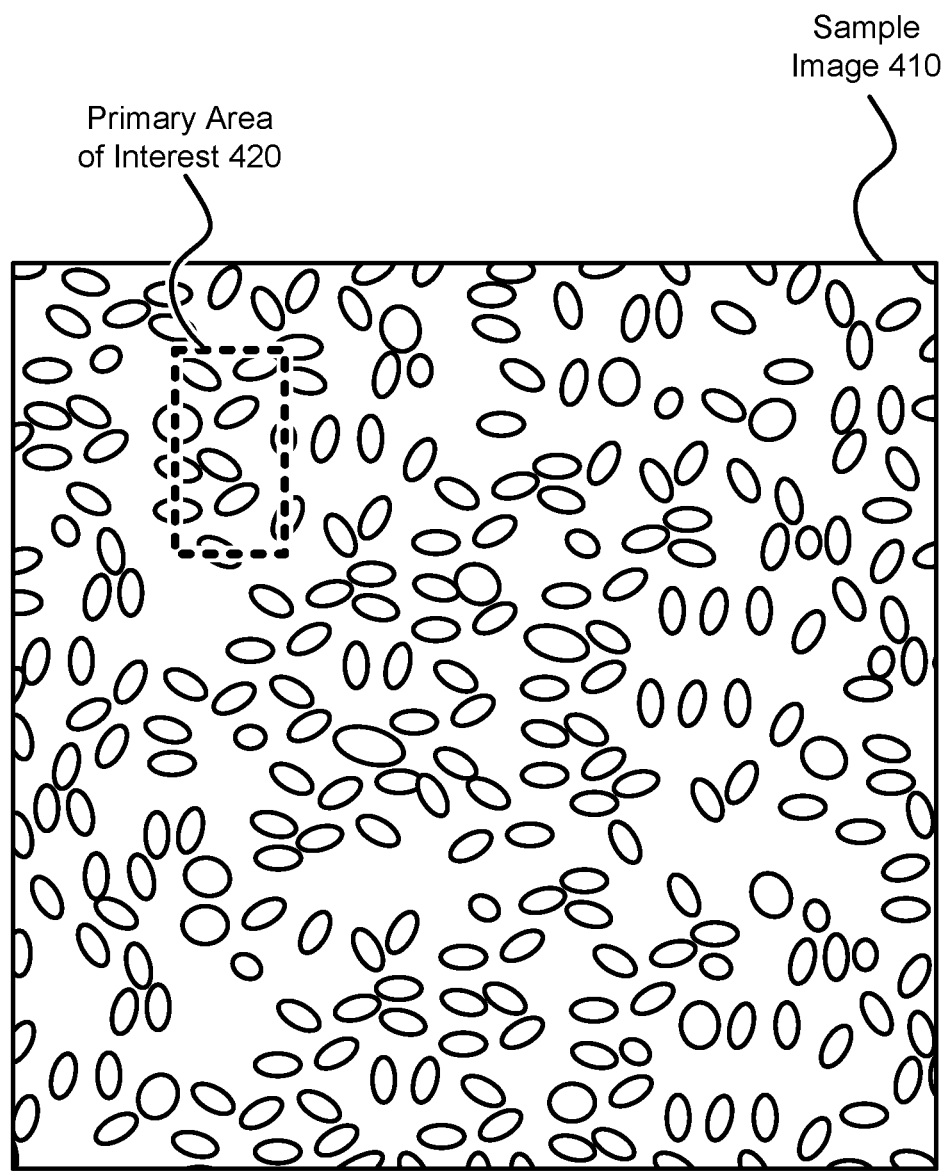

Turning to FIG. 4D a third diagram of sample image 410 in accordance with an embodiment is shown. To document the diagnosis, the SME establishes primary area of interest 420 which is relevant to the medical diagnosis. For example, primary area of interest 420 may correspond to a collection of cells that indicate a medical condition. However, the medical diagnosis may also take into account the other areas of sample image 410 that the SME reviewed.

Figure 4E:
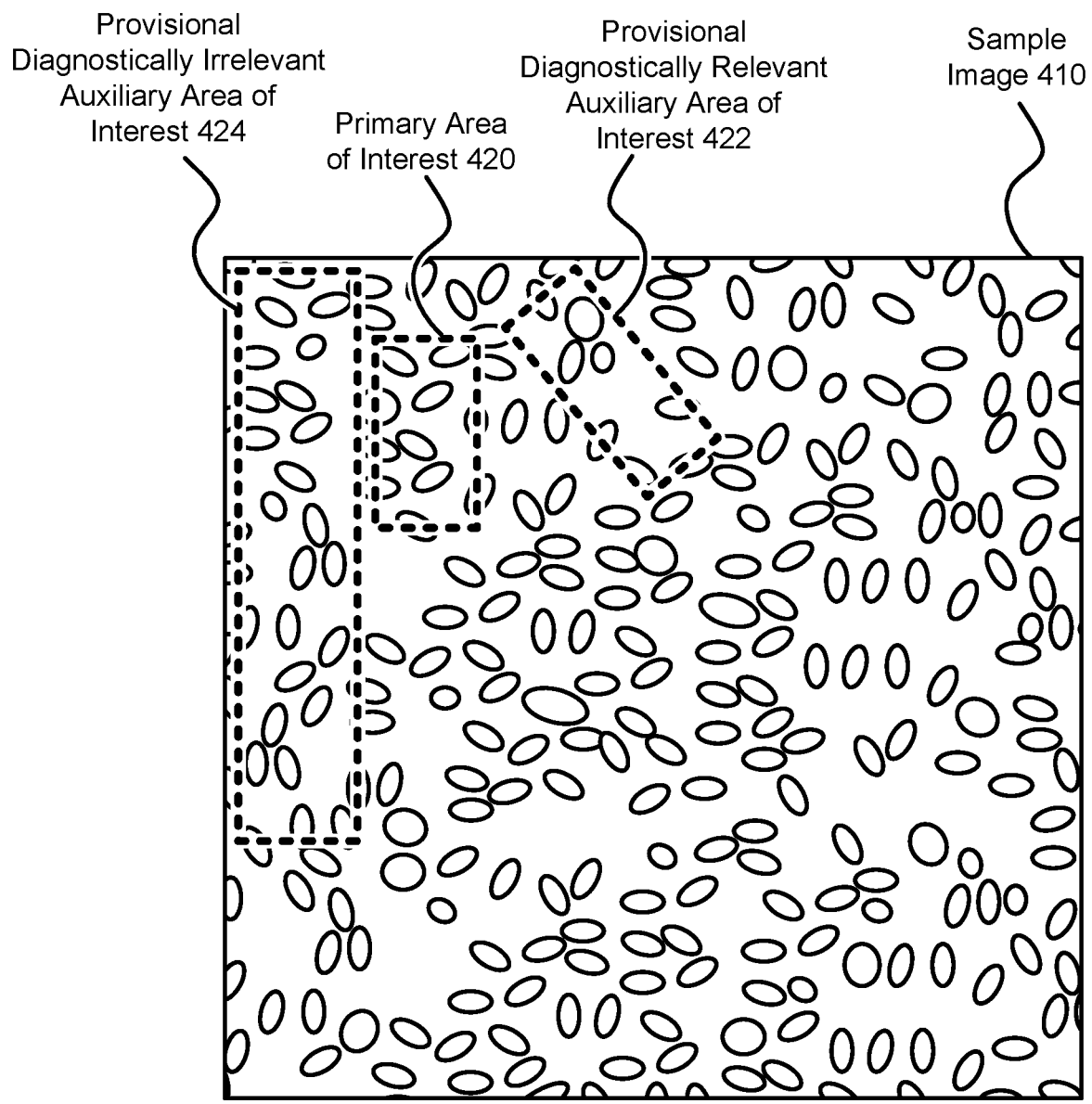

Turning to FIG. 4E a fourth diagram of sample image 410 in accordance with an embodiment is shown. The imagining system may then, based on the focus indicators illustrated in FIG. 4D, establish provisional auxiliary areas of interest 422, 424. For example, while the SME is conducting the image exploration the imaging system may automatically add these auxiliary areas of interest 424 to sample image 410 based on the focus indicators.

For example, provisionally diagnostically relevant auxiliary area of interest 422 may be added based on the focused portions 413A, 414B shown in FIG. 4C, due to the duration of time that the SME spent focusing on these portions. While not shown, a heat map and thresholds may have been used to identify these areas based on the focused portions 413A, 414B.

Additionally, provisional diagnostically irrelevant auxiliary area of interest 424 may also be added based on the focus portions shown in FIG. 4C. As seen in FIG. 4C, the area of sample image 410 corresponding to provisional diagnostically irrelevant auxiliary area of interest 424 did not receive any of the SME's focus. Thus, provisional diagnostically irrelevant auxiliary area of interest 424 may be added to reflect that the previous interpreter did not consider these portions of sample image 410 to be relevant to the previously made medical diagnosis.

Figure 4F:
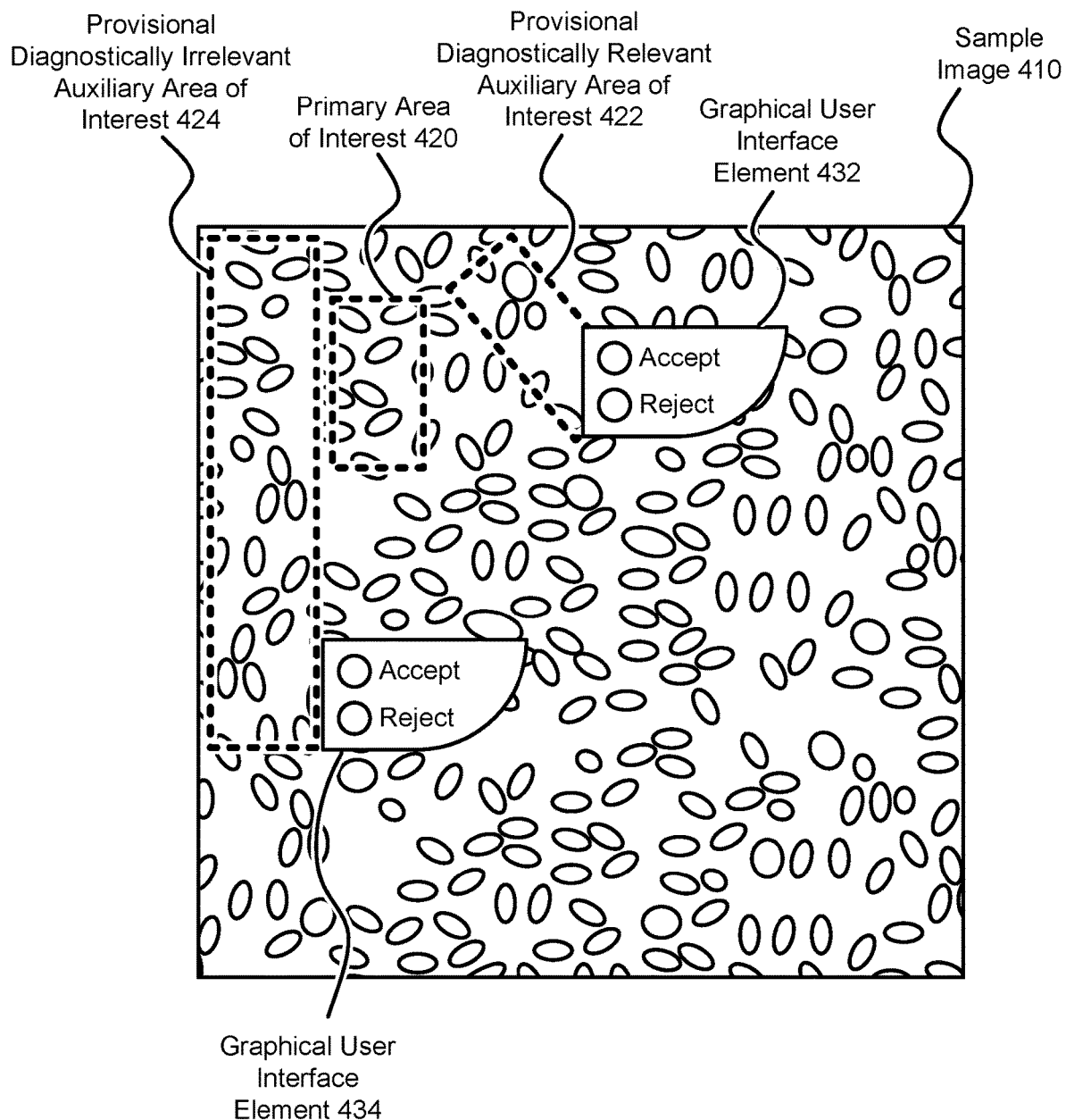

When these auxiliary areas of interest 422, 424 are established, the SME may be prompted to accept or reject them, or may be automatically added/accepted without SME review. Turning to FIG. 4F a fifth diagram of sample image 410 in accordance with an embodiment is shown. To facilitate SME acceptance or rejection, graphical user interface elements 432, 434 corresponding to the auxiliary areas of interest 422, 424 may be added to the graphical user interface. These graphical user interface elements may include field, widgets, and/or other features for receiving input from the SME. Through these graphical user interface elements, the SME may accept or reject the provisional auxiliary areas of interest 422, 424. Additionally, the graphical user interface elements may include fields usable to tag the areas of interest to identify, for example, landmarks or other features within a scene depicted by sample image 410. The content of the tags may be suggested or be left entirely to the discretion of the SME.

Once the areas of interest (primary and auxiliary) are established, sample image 410 may be stored. To ascertain how to store sample image 410, imaging system 404 may perform the method illustrated in FIG. 3A. To do so, imaging system 404 may segment and allocate the image segments for storage purposes.

Figure 4G:
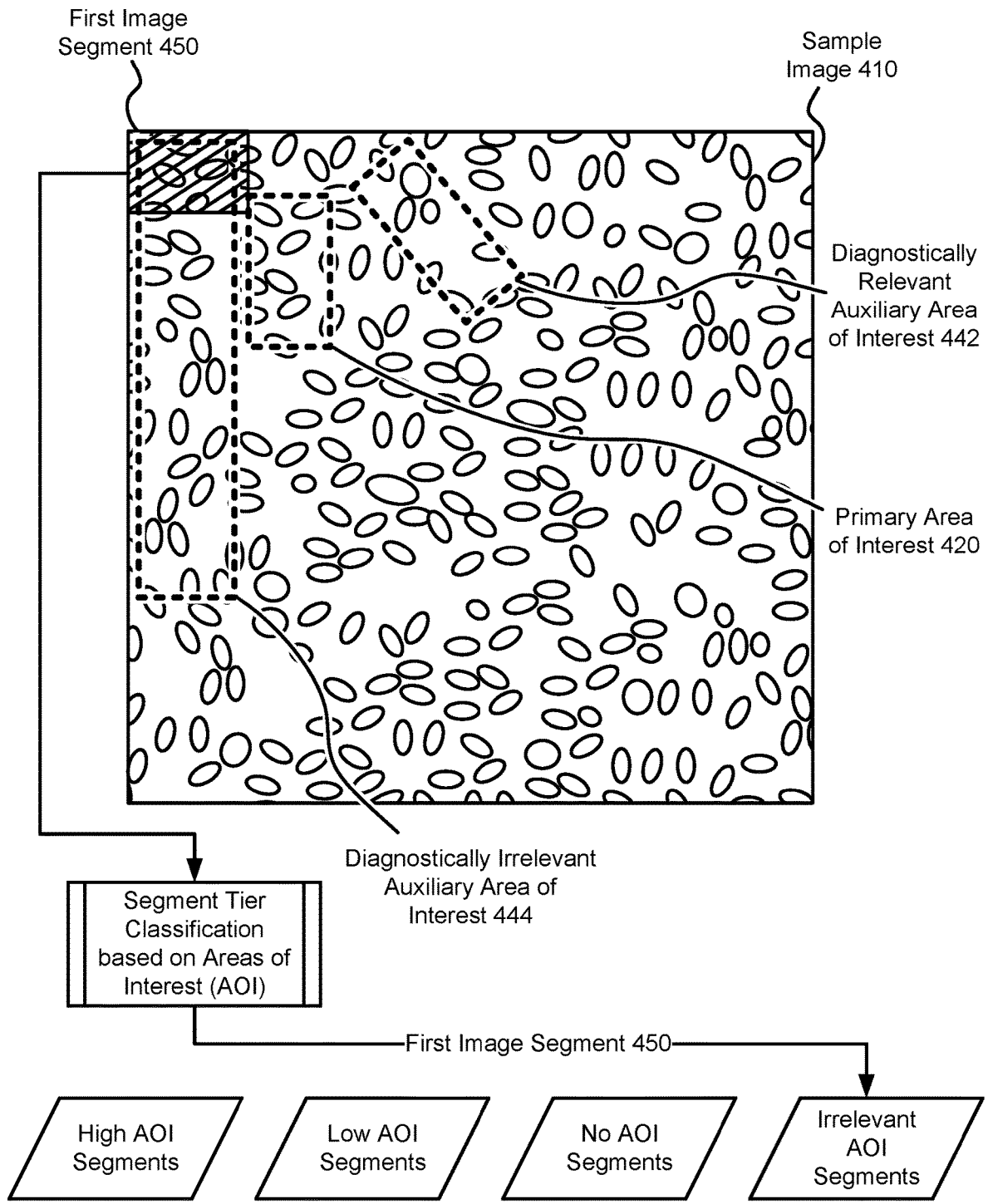
Figure 4H:
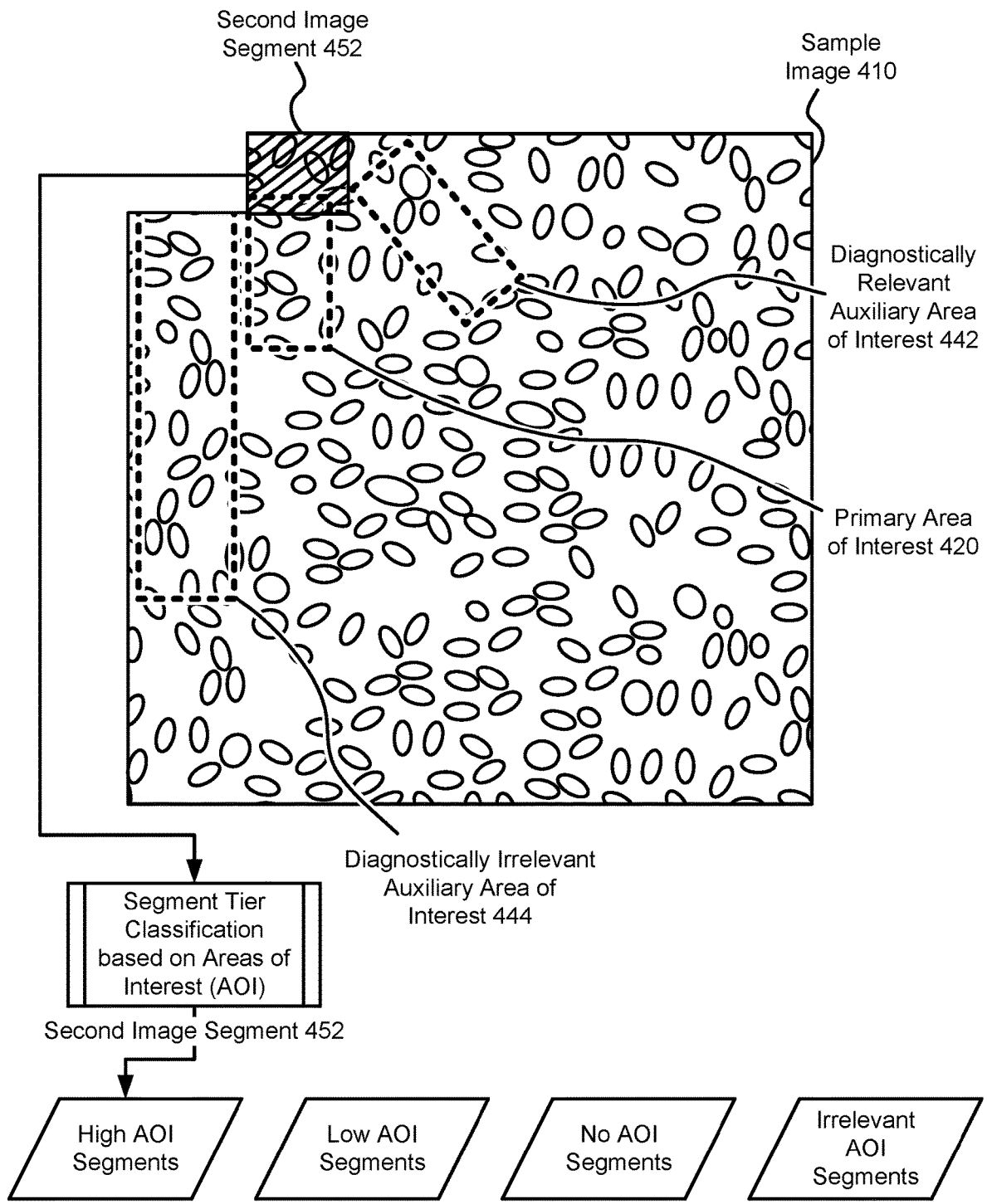
Figure 4I:
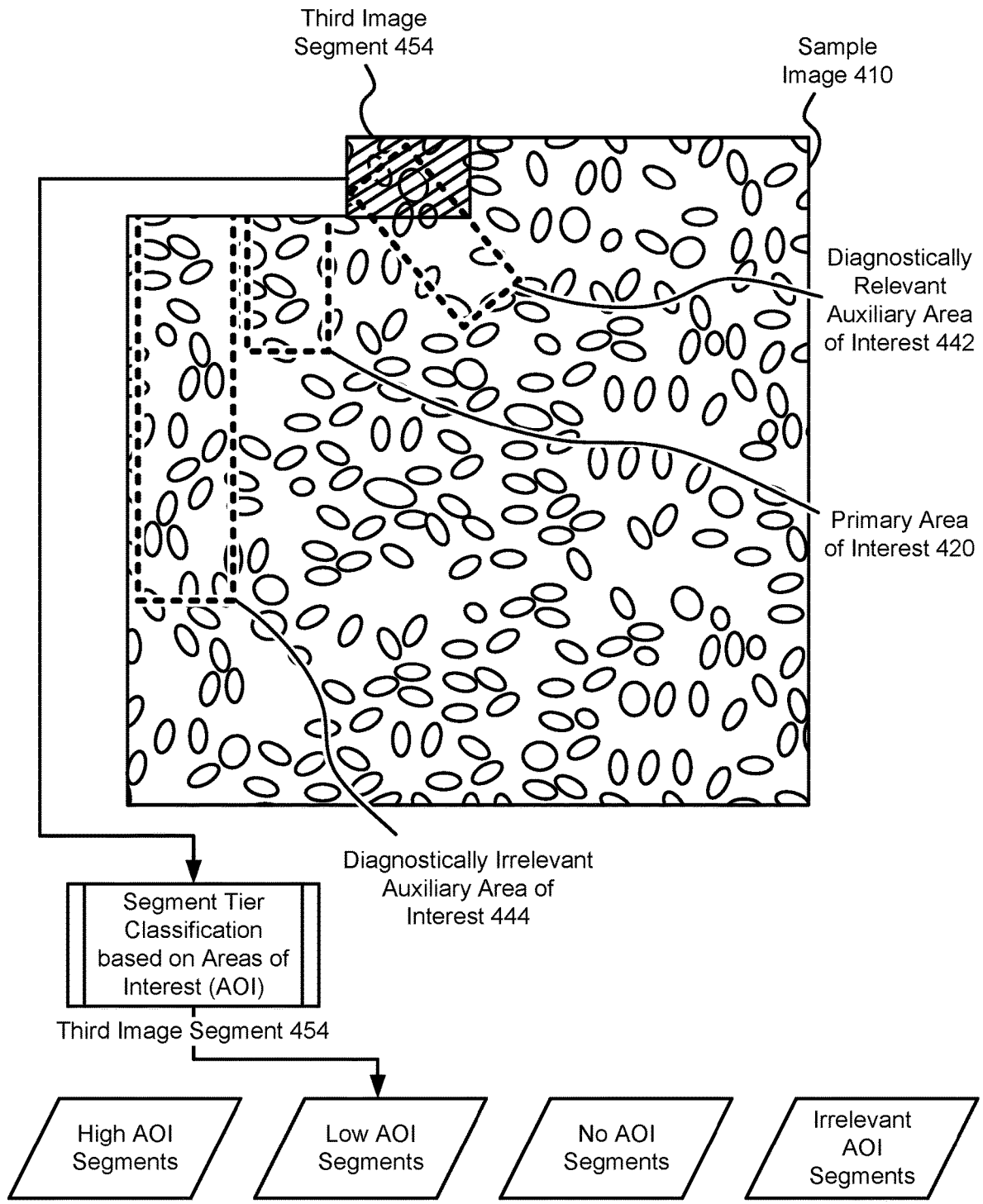
Figure 4J:
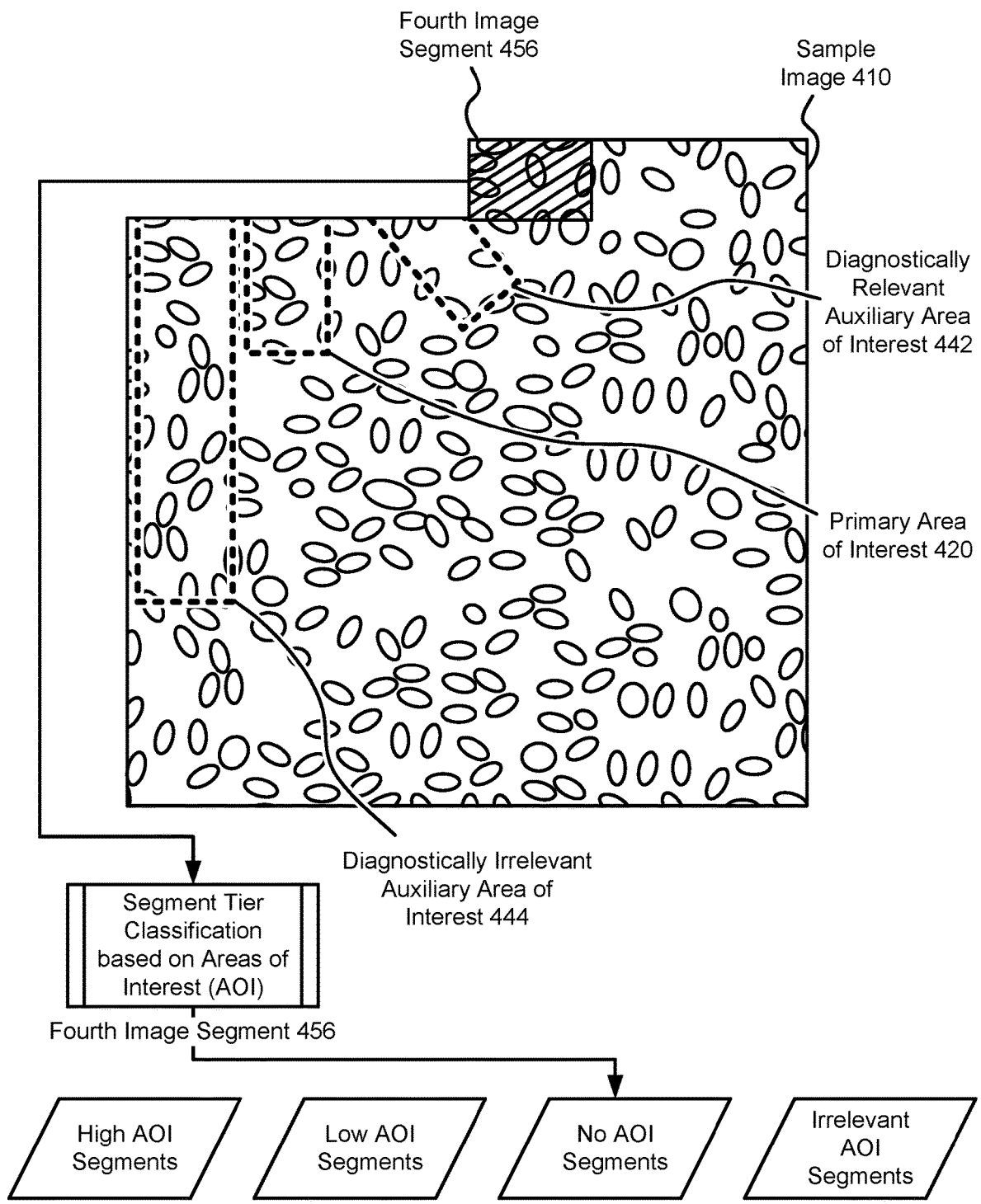

Turning to FIG. 4G, a sixth diagram of sample image 410 including a designation of an image segment in accordance with an embodiment is shown. As seen in FIG. 4G, imaging system 404 may segment sample image 410 to obtain first image segment 450. In FIG. 4G, first image segment 450 includes the portion of sample image 410 defined by the rectangle with lined infill. First image segment 440 may be subjected to segment tier classification based on areas of interest associated with first image segment 450. As seen in FIG. 4G, first image segment 450 is associated with diagnostically irrelevant auxiliary areas of interest. Thus, first image segment 450 may be classified as an irrelevant area of interest segment.

Turning to FIG. 4H, a seventh diagram of sample image 410 including a second image segment designation in accordance with an embodiment is shown. As seen in FIG. 4H, imaging system 404 may continue to segment sample image 410 to obtain second image segment 452. In FIG. 4H, second image segment 452 includes the portion of sample image 410 defined by the rectangle with lined infill. Second image segment 452 may be subjected to segment tier classification based on areas of interest associated with second image segment 452. As seen in FIG. 4H, second image segment 452 is associated with primary area of interest 420 (e.g., includes some of sample image 410 that falls within primary area of interest 420). Thus, second image segment 452 may be classified as a high area of interest image segment.

Turning to FIG. 4I, an eighth diagram of sample image 410 including a third image segment designation in accordance with an embodiment is shown. As seen in FIG. 4I, imaging system 404 may continue to segment sample image 410 to obtain third image segment 454. In FIG. 4I, third image segment 454 includes the portion of sample image 410 defined by the rectangle with lined infill. Third image segment 454 may be subjected to segment tier classification based on areas of interest associated with third image segment 454. As seen in FIG. 4I, third image segment 454 is associated with diagnostically relevant auxiliary area of interest 422 (e.g., includes some of sample image 410 that falls within diagnostically relevant auxiliary area of interest 422). Thus, third image segment 454 may be classified as a low area of interest image segment.

Turning to FIG. 4J, a ninth diagram of sample image 410 including a fourth image segment designation in accordance with an embodiment is shown. As seen in FIG. 4I, imaging system 404 may continue to segment sample image 410 to obtain fourth image segment 456. In FIG. 4J, fourth image segment 456 includes the portion of sample image 410 defined by the rectangle with lined infill. Fourth image segment 456 may be subjected to segment tier classification based on areas of interest associated with fourth image segment 456. As seen in FIG. 4J, fourth image segment 456 is not associated with any areas of interest. Thus, fourth image segment 456 may be classified as a no area of interest image segment.

This processes may be repeated for each of the image segments of sample image 410. The classifications may then be used to obtain a storage tier designation for each of the image segments, which may be used to drive storage of the image segments. While shown with respect to image segments of similar sizes and shapes, image segments may have different shapes and/or sizes without departing from embodiments disclosed herein.

By doing so, embodiments disclosed herein may provide a system that identifies primary areas of interest as well as auxiliary areas of interest in an image. The primary and auxiliary areas of interest may be relevant downstream users of the image. In order to facilitate computer-implemented services using the images (e.g., a medical expert evaluating a diagnosis made by an inference model using a tissue biopsy image), both primary and auxiliary areas of interest may be made available to the recipient of the services (e.g., the medical expert performing a subsequent interpretation of the image). Consequently, the medical expert may have information available to accurately assess the diagnosis made by a previous interpreter without requiring access to the entire image. Further, by storing image segments based on their associations to different area of interest types, limited storage resources may be more efficiently marshaled to store the images.

Figure 5:
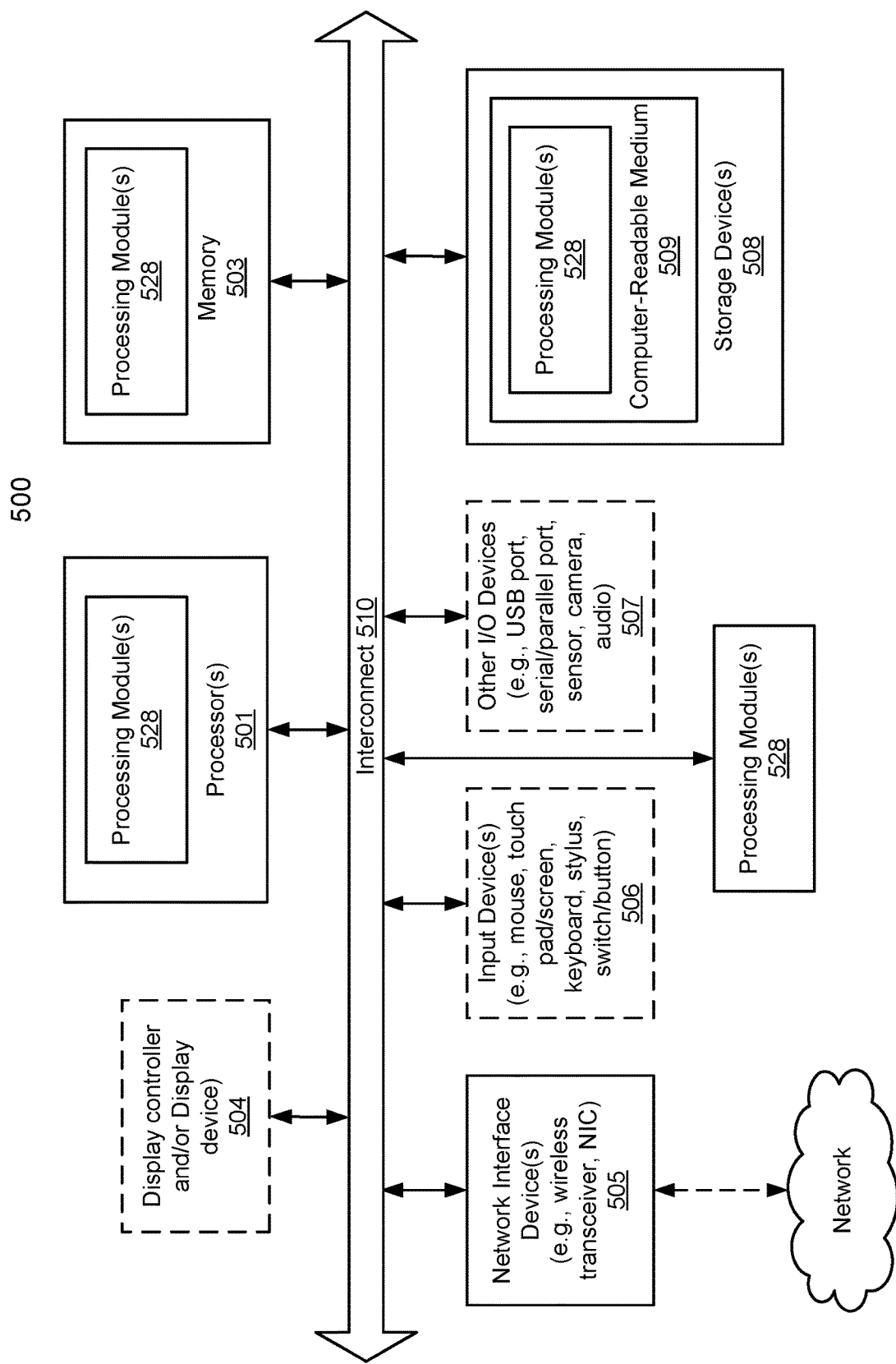
FIG. 5 shows a block diagram illustrating a data processing system in accordance with an embodiment.

Any of the components illustrated in FIGS. 1-4J may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing images for use by downstream consumers, the method comprising:
    obtaining an image of the images;
    obtaining a primary area of interest for the image;
    while obtaining the primary area of interest, obtaining focus indicators for the image based on a process through which the primary area of interest is obtained;
    obtaining, based on the focus indicators, an auxiliary area of interest for the image, the primary area of interest and the auxiliary area of interest both being areas of interest within the image that are separate from areas of no interest within the image;
    classifying the auxiliary area of interest as being relevant or irrelevant to the primary area of interest to obtain a relevant auxiliary area of interest or an irrelevant auxiliary of interest, respectively, the relevant auxiliary area of interest and the irrelevant auxiliary area of interest being different from the areas of no interest;
    segmenting the image into image segments comprising at least:
        non-mixed image segments containing only one of the primary area of interest, the relevant auxiliary area of interest, irrelevant auxiliary area of interest, and the areas of no interest, and
        mixed image segments containing a mix of at least two among the primary area of interest, the relevant auxiliary area of interest, irrelevant auxiliary area of interest, and the areas of no interest; and
    storing the image segments of the image in storage tiers based on an amount of the primary area of interest, the relevant auxiliary area of interest, the irrelevant auxiliary area of interest, and the areas of no interest contained within each of the image segments to facilitate use of the stored image by the downstream consumers, wherein each of the mixed image segments is stored into the storage tiers based on a likelihood of each of the mixed image segments being accessed after being stored in the storage tiers, the likelihood being based on an access likelihood hierarchy established between the primary area of interest, the relevant auxiliary area of interest, irrelevant auxiliary area of interest, and the areas of no interest, and
    wherein, for a mixed image segment of the mixed image segments, the mixed image segment is stored into the storage tiers based on a highest access likelihood portion contained within the mixed image segment, the highest access likelihood portion being determined based on a content of the mixed image segment and the access likelihood hierarchy.

2. The method of claim 1, wherein obtaining the focus indicators comprises:
while a subject matter expert views the image to annotate the primary area of interest for the image, correlating the subject matter expert's view of the image to portions of the image during the process through which the primary area of interest is obtained to obtain the focus indicators.

3. The method of claim 2, wherein the auxiliary area of interest is a diagnostically relevant area of interest in an instance of the focus indicators that specify that the subject matter expert focused on a portion of the portions of the image that covers only the auxiliary area of interest instead of an entirety of the image for a duration of time that exceeded a first time threshold but that is still less than a second time threshold associated with the primary area of interest.

4. The method of claim 2, wherein the auxiliary area of interest is a diagnostically irrelevant area of interest in an instance of the focus indicators that specify that the subject matter expert focused on a portion of the portions of the image for a duration of time that failed to meet a time threshold associated with the primary area of interest.

5. The method of claim 1, wherein obtaining the primary area of interest comprises:
presenting portions of an image to a subject matter expert;
receiving user input from the subject matter expert; and
establishing the primary area of interest based on the user input.

6. The method of claim 5, wherein obtaining the focus indicators comprises:
monitoring interest levels of the subject matter expert for the portions of the image; and
establishing the focus indicators based on the interest levels.

7. The method of claim 6, wherein monitoring the interest levels comprises:
tracking eye movement of the subject matter expert during presentation of the portions of the image.

8. The method of claim 7, further comprising:
establishing an interest hierarchy for the portions of the image based on the tracked eye movement.

9. The method of claim 1, wherein the auxiliary area of interest is stored in a second tier of tiered storages when classified as being relevant to the primary interest and in a fourth tier different when classified as being irrelevant to the primary interest, the second tier and the fourth tier being different from a first tier of the tiered storage adapted for storing the primary area of interest.

10. The method of claim 1, wherein the image segments are classified into four segment categories comprising a high area of interest segment that comprises the primary area of interest, an irrelevant area of interest segment that comprises the irrelevant auxiliary area of interest, a low area of interest segment that comprises the relevant auxiliary area of interest, and a no area of interest segment that comprises the areas of no interest.

11. The method of claim 1, further comprising:
after storing the image segments of the image in the storage tiers, obtaining a request to view the image; and
making, in response to the request, only the image segments, among the mixed image segments and the non-mixed image segments, that comprise the primary area of interest, the relevant auxiliary area of interest, and the irrelevant auxiliary area of interest available to be displayed on a graphical user interface without providing access to an entirety of the image.

12. The method of claim 11, wherein obtaining the primary area of interest and the auxiliary area of interest for the image comprises:
generating a heat map for the image, the heat map comprising values for each pixel of pixels making up the image, and the values being weighted based on a duration of display of each of the pixels on a graphical user interface on which the image is displayed; and
filtering the heat map using a plurality of thresholds to generate at least one interest indicator among one or more interest indicators for one or more portions of the heat map, each of the one or more interest indicators corresponds to one of the primary area of interest, the relevant auxiliary area of interest, irrelevant auxiliary area of interest, and the areas of no interest.

13. A non-transitory machine-readable medium having instructions stored therein, which when executed by a processor, cause the processor to perform operations for managing images for use by downstream consumers, the operations comprising:
obtaining an image of the images;
obtaining a primary area of interest for the image;
while obtaining the primary area of interest, obtaining focus indicators for the image based on a process through which the primary area of interest is obtained;
obtaining, based on the focus indicators, an auxiliary area of interest for the image, the primary area of interest and the auxiliary area of interest both being areas of interest within the image that are separate from areas of no interest within the image;
classifying the auxiliary area of interest as being relevant or irrelevant to the primary area of interest to obtain a relevant auxiliary area of interest or an irrelevant auxiliary of interest, respectively, the relevant auxiliary area of interest and the irrelevant auxiliary area of interest being different from the areas of no interest;
segmenting the image into image segments comprising at least:
non-mixed image segments containing only one of the primary area of interest, the relevant auxiliary area of interest, irrelevant auxiliary area of interest, and the areas of no interest, and
mixed image segments containing a mix of at least two among the primary area of interest, the relevant auxiliary area of interest, irrelevant auxiliary area of interest, and the areas of no interest; and
storing the image segments of the image in storage tiers based on an amount of the primary area of interest, the relevant auxiliary area of interest, the irrelevant auxiliary area of interest, and the areas of no interest contained within each of the image segments to facilitate use of the stored image by the downstream consumers, wherein each of the mixed image segments is stored into the storage tiers based on a likelihood of each of the mixed image segments being accessed after being stored in the storage tiers, the likelihood being based on an access likelihood hierarchy established between the primary area of interest, the relevant auxiliary area of interest, irrelevant auxiliary area of interest, and the areas of no interest, and
wherein, for a mixed image segment of the mixed image segments, the mixed image segment is stored into the storage tiers based on a highest access likelihood portion contained within the mixed image segment, the highest access likelihood portion being determined based on a content of the mixed image segment and the access likelihood hierarchy.

14. The non-transitory machine-readable medium of claim 13, wherein obtaining the primary area of interest comprises:
   presenting portions of an image to a subject matter expert;
   receiving user input from the subject matter expert; and
   establishing the primary area of interest based on the user input.

15. The non-transitory machine-readable medium of claim 14, wherein obtaining the focus indicators comprises:
   monitoring interest levels of the subject matter expert for the portions of the image; and
   establishing the focus indicators based on the interest levels.

16. The non-transitory machine-readable medium of claim 15, wherein monitoring the interest levels comprises:
   tracking eye movement of the subject matter expert during presentation of the portions of the image.

17. A data processing system, comprising:
   a processor; and
   a memory coupled to the processor to store instructions, which when executed by the processor, cause the processor to perform operations for managing images for use by downstream consumers, the operations comprising:
      obtaining an image of the images;
      obtaining a primary area of interest for the image;
      while obtaining the primary area of interest, obtaining focus indicators for the image based on a process through which the primary area of interest is obtained;
      obtaining, based on the focus indicators, an auxiliary area of interest for the image, the primary area of interest and the auxiliary area of interest both being areas of interest within the image that are separate from areas of no interest within the image;
      classifying the auxiliary area of interest as being relevant or irrelevant to the primary area of interest to obtain a relevant auxiliary area of interest or an irrelevant auxiliary of interest, respectively, the relevant auxiliary area of interest and the irrelevant auxiliary area of interest being different from the areas of no interest;
      segmenting the image into image segments comprising at least:
         non-mixed image segments containing only one of the primary area of interest, the relevant auxiliary area of interest, irrelevant auxiliary area of interest, and the areas of no interest, and
         mixed image segments containing a mix of at least two among the primary area of interest, the relevant auxiliary area of interest, irrelevant auxiliary area of interest, and the areas of no interest; and
      storing the image segments of the image in storage tiers based on an amount of the primary area of interest, the relevant auxiliary area of interest, the irrelevant auxiliary area of interest, and the areas of no interest contained within each of the image segments to facilitate use of the stored image by the downstream consumers, wherein each of the mixed image segments is stored into the storage tiers based on a likelihood of each of the mixed image segments being accessed after being stored in the storage tiers, the likelihood being based on an access likelihood hierarchy established between the primary area of interest, the relevant auxiliary area of interest, irrelevant auxiliary area of interest, and the areas of no interest, and
      wherein, for a mixed image segment of the mixed image segments, the mixed image segment is stored into the storage tiers based on a highest access likelihood portion contained within the mixed image segment, the highest access likelihood portion being determined based on a content of the mixed image segment and the access likelihood hierarchy.

18. The data processing system of claim 17, wherein obtaining the primary area of interest comprises:
   presenting portions of an image to a subject matter expert;
   receiving user input from the subject matter expert; and
   establishing the primary area of interest based on the user input.

19. The data processing system of claim 18, wherein obtaining the focus indicators comprises:
   monitoring interest levels of the subject matter expert for the portions of the image; and
   establishing the focus indicators based on the interest levels.

20. The data processing system of claim 19, wherein monitoring the interest levels comprises:
   tracking eye movement of the subject matter expert during presentation of the portions of the image.

* * * * *